(12) United States Patent
Miyamoto et al.

(10) Patent No.: US 6,559,996 B1
(45) Date of Patent: May 6, 2003

(54) OPTICAL TRANSMISSION SYSTEM

(75) Inventors: Yutaka Miyamoto, Tokyo (JP);
Kazushige Yonenaga, Tokyo (JP);
Shoichirou Kuwahara, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 09/362,310

(22) Filed: Jul. 28, 1999

(30) Foreign Application Priority Data

Jul. 29, 1998 (JP) ............................................. 10-214209

(51) Int. Cl.[7] ............................................... H04B 10/04
(52) U.S. Cl. ......................................... 359/181; 359/158
(58) Field of Search .................................. 359/158, 181

(56) References Cited

U.S. PATENT DOCUMENTS

| | | | |
|---|---|---|---|
| 5,543,952 A | * | 8/1996 | Yonenaga et al. .......... 359/181 |
| 5,625,722 A | | 4/1997 | Froberg et al. ................ 385/1 |
| 5,917,638 A | * | 6/1999 | Franck et al. ................ 359/181 |
| 6,072,615 A | * | 6/2000 | Mamyshev ............. 359/181 X |

FOREIGN PATENT DOCUMENTS

JP  8-254673  10/1996

OTHER PUBLICATIONS

Sano et al, " Gbit/s, 300 km repeaterless transmission with SBS suppression by the use of the RZ format", IEEE Electronics Letters, vol. 30, No. 20, pp. 1694–1695, Sep. 1994.*

* cited by examiner

*Primary Examiner*—Thomas Mullen
(74) *Attorney, Agent, or Firm*—Arent Fox Kintner Plotkin & Kahn, PLLC

(57) ABSTRACT

The present invention relates to an optical transmission system which reduces optical signal bandwidth with return-to-zero (RZ) signal.

8 Claims, 28 Drawing Sheets

OPTICAL CARRIER FREQUENCY $f_c$

*Fig. 7*
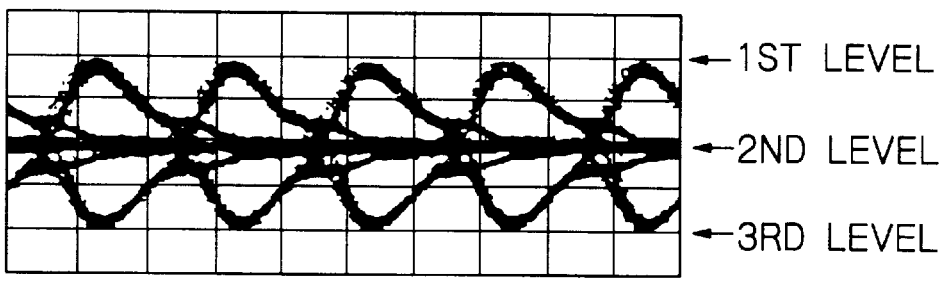
(a) DIFFERENTIATED SIGNAL
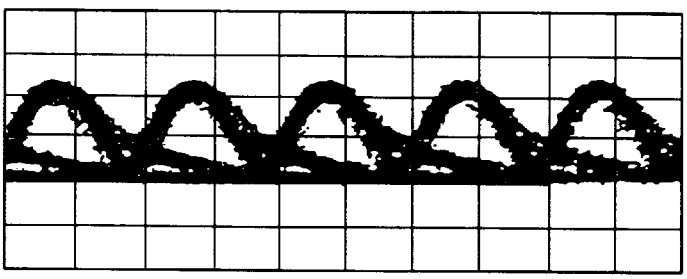
(b) PHASE INVERTED RZ    MARK RATIO
    OPTICAL SIGNAL       1/2
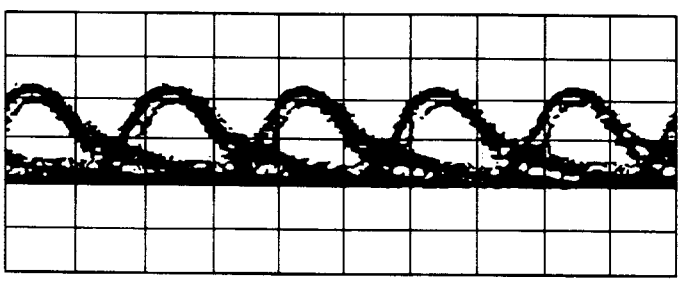
(c) PHASE INVERTED RZ    MARK RATIO
    OPTICAL SIGNAL       1/4
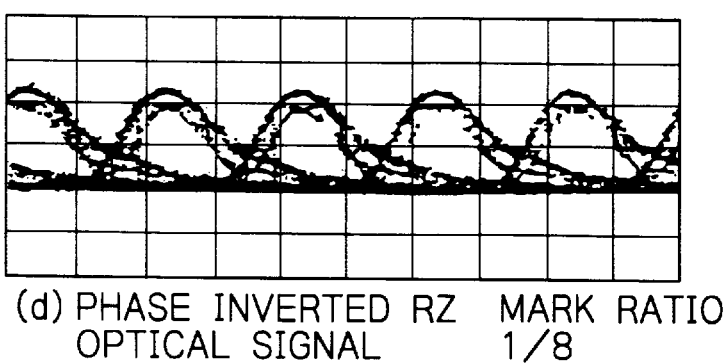
(d) PHASE INVERTED RZ    MARK RATIO
    OPTICAL SIGNAL       1/8

Fig. 14

A: INPUT NRZ ELECTRICAL SIGNAL
  1  0  1  1  1  0  1  0

B: PRE-CODE NRZ ELECTRICAL SIGNAL
  B1
  B2

C: OUTPUT OF AND CIRCUIT
  $C2 = \overline{A+B1}$
  $\phantom{C2} = C1$ $C3 = \overline{A+B2}$
  $\phantom{C3} = C4$ D: DIFFERENTIAL OUTPUT OF AND CIRCUIT
  $D1 = \overline{D2}$
  $\phantom{D1} = C2$ $D3 = \overline{D4}$
  $\phantom{D3} = C3$

F: CLOCK OPTICAL PULSE
  F

G: OPTICAL MODULATED SIGNAL
  G

0   π   0   π   0
OPTICAL PHASE

*Fig. 23*

A : INPUT NRZ ELECTRICAL SIGNAL 1 0 1 1 1 0 1 0

B : PRE-CODE NRZ ELECTRICAL SIGNAL

B1

B2

C : OUTPUT OF AND CIRCUIT $C2 = \overline{A+B1}$
$= C1$ $C3 = \overline{\overline{A}+B2}$
$= C4$

D : OUTPUT OF DIFFERENTIAL POWER SUM $D1' = \overline{D2}$

F : CLOCK OPTICAL PULSE

F

G : RZ OPTICAL MODULATED SIGNAL

G

0   π   0   π   0

OPTICAL PHASE

NRZ OPTICAL SIGNAL SPECTRUM

RZ OPTICAL SIGNAL SPECTRUM

OPTICAL TRANSMISSION SYSTEM

BACKGROUND OF THE INVENTION

The present invention relates to an optical transmission system, and a transmitter and/or receiver used in optical communication, in particular, relates to such a system which reduces optical signal bandwidth with return-to-zero (RZ) signal, and base-band electrical signal bandwidth in a transmitter.

Recently, an optical amplifier having high output power and wideband characteristics has been used in an optical transmission system, and input fiber launched power in an optical transmission line exceeds 10 dBm. As a result, the Kerr effect in which refractive index in an optical fiber is modulated by an input optical signal itself occurs, and therefore, an optical signal is phase modulated, the optical modulation spectrum is spread, and the waveform is subject to be distorted due to chromatic dispersion in an optical fiber. Further, in a wavelength division multiplex system, waveform and S/N ratio are degraded because of non-linear cross talk between channels.

It is recognized that above problems depend upon format of signals, and RZ (return-to-zero) signal in which each bit has equal pulse width with each other is preferable to NRZ (non-return-to-zero) signal since equalization of waveform distortion due'to non-linear effect after fiber transmission is easy in RZ signal.

For instance, in an inline-repeatered system in which the dispersion of 1.3 μm zero dispersion optical fiber line is compensated for each repeater section, it is estimated in a simulation that the regenerative repeater section for RZ signal may be three times as long as that for NRZ signal (reference; D. Breuer et al, "Comparison of NRZ and RZ-Modulation format for 40 Gbit/s TDM Standard-Fiber System", IEEE Photon. Technol. Lett. vol 9, No. 3, pp. 398–400, 1997). Further, an experimental report (R. M. Jopson et al, "Evaluation of return-to-zero modulation for wavelength division multiplexed transmission over conventional single-mode-fiber", Tech. Digest of Optical Fiber Comm. Conf, '98 FEI, pages 406–407, 1998) shows that RZ signal may have higher power for each channel than NRZ signal in 10 Gbit/s 8-waves WDM transmission system. Further, another experimental report (A.Sano et al, IEE Electronics Letters vol 30, pages 1694–1695, 1994) shows that phase modulation synchronized with transmission data effectively suppresses SBS (Stimulated Brillouin Scattering) higher fiber launched power.

Therefore, it is preferable to use RZ signal format in long distance optical transmission system.

A prior optical transmission system with RZ (return-to-zero) signal format is shown in FIGS. 28 and 29.

In FIG. 28, an input NRZ signal (non-return-to-zero) is applied to a NRZ/RZ converter 51 which converts NRZ electrical signal format to RZ electrical signal format. An output signal of the converter in RZ signal format is applied to an RZ optical modulator 50 through an amplifier 52 which amplifies a RZ electrical signal. The optical modulator 50 modulates CW (continuous wave) optical signal from an optical source 5 with a RZ electrical signal from the amplifier 52, and provides modulated optical signal.

In FIG. 29, an input electrical NRZ signal is applied to a modulator driver 62 which amplifies the electrical signal. The output of the modulator driver 62 is applied to a first NRZ optical intensity modulator 60 which modulates continuous wave (CW) from an optical source 5 with the NRZ signal from the amplifier 62. An output of the first modulator 60 is applied to a second optical intensity modulator 61 which modulates the input NRZ signal of the same with electrical sinusoidal wave of an output signal of a clock modulator driver 63. The clock modulator driver 63 provides a clock signal with frequency B (Hz) (B; transmission symbol rate) which is synchronized with an input NRZ electrical signal. Thus, a final RZ optical signal is obtained at the output of the second modulator 61. This prior art is shown in, for instance, A. Sano et al. IEEE electronics Letters vol. 30, pages 1694–1695, 1994.

Another prior art is shown in JP patent laid open 254673/ 1996 (which corresponds to U.S. Pat. No. 5,625,722; "Method and Apparatus for Generating data encoded Pulses in Return-to-zero Format"), in which periodical transmittance of a Mach-Zehnder type optical intensity modulator is used in full-wave rectifying characteristics using amplitude folding electrical-optical response of the Mach-Zehnder type optical intensity modulator, and binary NRZ electrical signal is converted to RZ optical signal. An input binary NRZ electrical signal is encoded in a pre-code circuit to produce coded NRZ electrical signal, then, two copies of the NRZ signal are produced, and one of the NRZ signal is logically inverted. RZ signal is generated by operating a Mach-Zehnder type optical intensity modulator with these differential coded NRZ electrical signal.

Further, the following three documents show how to produce optical clock pulses from clock electrical signal.

(1) K. Iwatsuki et al. "Generation of transform limited gain-switched DFB-LD pulses <6 ps with linear fiber compression and spectral window", Electronics Letters vol. 27, pp 1981–1982, 1991. In this document, a gain switch semiconductor laser is used as a generation element.

(2) M. Suzuki, et al, "New application of sinusoidal driven InGaAsP electroabsorption modulator to in-line optical gate with ASE noise reduction effect", J. Lightwave Technol. 1992, vol. 10 pp. 1912–1918. This document shows how to modulate CW optical signal generated by a semiconductor laser by using an electroabsorption type external modulator.

(3) K. Sato et al, "Frequency Range Extension of actively mode-locked lasers integrated with electroabsorption modulators using chirped grating" J. of selected topics in quantum electonics vol. 3, No. 2, 1997, pp. 250–255. This document shows an integrated mode-locked semiconductor laser. But, these three papers do not describe modulation means.

However, above prior art have the disadvantage that an output RZ optical signal has optical bandwidth larger than 4B when transmission rate is B (bit/s). That figure is twice as large as the bandwidth of NRZ optical signal. Therefore, an output RZ signal in prior art is subject to waveform distortion because of chromatic dispersion in an optical transmission fiber as compared with a NRZ optical signal.

FIG. 30 shows NRZ optical signal spectrum in the prior art, and FIG. 31 shows RZ optical signal spectrum in the prior art. It should be noted in FIGS. 30 and 31 that RZ optical signal has bandwidth twice as large as that of NRZ optical signal.

Further, in the prior art of FIG. 28, a NRZ/RZ converter 51, an amplifier 52 and an optical modulator 50 must have the operational bandwidth twice (DC through 2B Hz) as large as the bandwidth (B) which is required for NRZ electrical signal. Thus, the higher the transmission rate is, the more difficult the design of a circuit is.

Further, in the prior art of FIG. 29, two optical modulators 60 and 61 are connected in series. Therefore, in order to keep S/N ratio of a resultant RZ signal output to be the same as that of NRZ optical signal, an output of an optical source 5 must be increased by 6–9 dB so that optical loss and modulation loss for one stage of an optical modulator are compensated, and therefore, an optical source must provide high output power. Further, a phase control circuit 64 is essential to adjust the modulation phase between the NRZ optical signal and the synchronization clock signal.

Further, in above prior art, an output RZ modulated optical signal has fine spectrum at fc±nxB (Hz) (n is an integer), where fc is carrier frequency of continuous wave light. Therefore, when signal power applied to an optical fiber exceeds 7 dBm, the input fiber launched power to a dispersion shifted fiber is limited because of Stimulated Brillouin Scattering (SBS). Therefore, an external linewidth modulation circuit 53 is necessary to enlarge linewidth of optical carrier for SBS suppression and increase allowable input power.

Further, RZ optical signal has optical carrier frequency component (fc) as shown in FIG. 31. Therefore, when RZ optical signal spectrum components are equal or higher than threshold density of Stimulated Brillouin Scattering (SBS), those high density spectrum components are back-scattered by SBS, and waveform is distorted. This is described, for instance, in H. Kawakami et al, "Overmodulation of intensity modulated signal due to Stimulated Brillouin Scattering", Electron. Lett. vol. 30, No. 18, pp. 1507–1508. When those RZ signals are wavelength division multiplexed (WDM), a portion having high optical spectrum density includes fourwave mixing (FWM), and cross talk due to pump depletion.

Further, in a prior RZ electrical driven amplifier which amplifies electrical signal directly (FIG. 28), when a modulator driver is an AC-coupling type, DC level of drive signal is fluctuated due to mark ratio of modulation signal, thus, output dynamic range of a driver circuit must be twice as large as that with fixed mark ratio. Further, a control circuit is necessary for controlling bias point of an optical intensity modulator according to mark ratio.

As described above, the prior art has the disadvantages that (1) since bandwidth for RZ optical signal is twice as large as that of NRZ optical signal, RZ optical signal is more sensitive to the distortion due to the chromatic dispersion of an optical fiber, (2) bandwidth required for an electrical circuit operating with RZ signals is twice as large as that for NRZ signal, (3) since input power to a fiber is limited due to SBS, an external circuit for enlarging optical carrier frequency linewidth is essential, (4) cross talk is generated due to four wave modulation (FWM), and that (5) DC level of drive signal is fluctuated because of mark ratio change.

SUMMARY OF THE INVENTION

An object of the present invention is to overcome the disadvantages and limitations of a prior optical transmission system by providing a new and improved optical transmission system.

It is an object of the present invention to provide an optical transmission system in which optical spectrum bandwidth for RZ optical signal is half as that of the prior art, and optical signal is less degraded due to chromatic dispersion in an optical fiber.

It is also an object of the present invention to provide an optical transmission system in which electrical signal bandwidth required for an electrical circuit and an optical intensity modulator is approximately equal to transmission rate B.

It is also an object of the present invention to provide an optical transmission system in which limitation of optical input fiber launched power due to SBS is essentially reduced.

It is also an object of the present invention to provide an optical transmission system in which output power of an optical source may be reduced.

It is also an object of the present invention to provide an optical transmission system in which cross talk because of four wave mixing (FWM) is eliminated.

It is also an object of the present invention to provide an optical transmission system in which no D.C. level fluctuation due to mark ratio change occurs.

It is also an object of the present invention to provide an optical transmission system in which input-pattern dependent inter-symbol interference is reduced in an optical transmitter/receiver.

The above and other objects are attained by an optical transmission system having an input terminal which receives NRZ (non-return-to-zero) electrical signal, and electrical-optical conversion means which receives said NRZ electrical signal and converts the same to RZ (return-to-zero) optical signal, wherein said electrical-optical conversion means comprises; pre-code means receiving an NRZ electrical signal in complementary form and providing a pre-coded signal which is an exclusive-OR signal of said NRZ electrical signal and delayed signal of said NRZ electrical signal by one bit; differentiation means for providing differentiated ternary level pulses having first level, second level and third level at a rising edge, a duration between a rising edge and a falling edge and a falling edge of said pre-coded signal, respectively, so that polarity of a pulse at said rising edge is opposite to that at said falling edge; and an optical intensity modulation means for providing an optical signal according to said differentiated pulses so that an optical phase corresponding to the first level of the differentiated pulse is opposite to an optical phase corresponding to the third level of the differentiated pulse. The optical output is turned off at the second level of input differentiated pulse.

Preferably, said optical intensity modulator comprises a Mach-Zehnder optical intensity modulator.

When an input NRZ signal is not in complementary form, but single end form, the similar operation is obtained if a pre-code means provides an output signal in complementary form.

As the present invention pre-codes an input NRZ electrical signal, then, it is differentiated, the pre-coded signal is D.C. balanced signal with no D.C. component, and in ternary form. Therefore, an electrical circuit and an optical intensity modulator are not required to operate to amplify and/or modulate in baseband signal component including D.C., and the required operational bandwidth is equal to transmission rate B. Further, as a differentiated signal includes no D.C. component, no D.C. level fluctuation occurs irrespective of mark ratio. Further, as one stage of optical intensity modulator is used, output power requested for CW optical source is decreased, as compared with the scheme in FIG. 29.

Further, as a differentiated signal is used, an optical RZ signal has no optical carrier frequency component irrespective of mark ratio, and RZ optical signal spectrum density is lower than that of the prior art. Therefore, RZ optical signal power in which the maximum spectrum density is equal to threshold value of Stimulated Brillouin Scattering in the present invention is higher than that of the prior art. Further, as the spectrum density is low, when wavelength division multiplexed signal is transmitted close to zero dispersion wavelength region, cross talk due to four wave mixing (FWM) is reduced, whereas said cross talk is serious in a prior RZ and/or a prior NRZ transmission system.

Further, according to the present invention, phase of an optical pulse is inverted pulse by pulse, therefore, when multi-path fading occurs due to polarization mode dispersion in a transmission line, phases of overlapped portion of pulse edges are opposite to each other. Therefore, in intensity modulated signal, intensity at pulse edges is cancelled by interference, and no inter-symbol interference occurs.

According to another embodiment of the present invention, an optical transmission system has an input terminal which receives NRZ (non-return-to-zero) electrical signal, and electrical-optical conversion means which receives said NRZ electrical signal and converts the same to RZ (return-to-zero) optical signal, wherein said electrical-optical conversion means comprises; clock electrical signal generation means for providing clock electrical signal with which said NRZ electrical signal is synchronized; clock pulse optical source receiving said clock electrical signal and providing optical clock pulse synchronized with said clock electrical signal; pre-code means receiving an NRZ electrical signal in signal-end form and providing a pre-coded signal in complementary form which is an exclusive-OR signal of said NRZ electrical signal and delayed signal of said exclusive-OR signal by one bit; a pair of complementary logical product means for providing complementary logical product signals each of which is a logical product of said NRZ electrical signal and one of pre-coded differential NRZ signals; an optical intensity modulation means having two modulation sections electrically isolated with each other and arranged in series along optical path for modulating intensity and phase of said optical clock pulse independently with said complementary logical product signals so that phase of an optical output signal is inverted for each mark code.

According to still another embodiment of the present invention, an optical transmission system has an input terminal which receives NRZ (non-return-to-zero) electrical signal, and electrical-optical conversion means which receives said NRZ electrical signal and converts the same to RZ (return-to-zero) optical signal, wherein said electrical-optical conversion means comprises; clock electrical signal generation means for providing clock electrical signal with which said NRZ electrical signal is synchronized; clock pulse optical source receiving said clock electrical signal and providing optical clock pulse synchronized with said clock electrical signal; pre-code means receiving an NRZ electrical signal in a single-end form and providing a pre-coded signal in complementary form which is an exclusive-OR signal of said NRZ electrical signal and delayed signal of said exclusive OR signal by one bit; a pair of complementary logical product means for providing logical product signals in complementary form, each of said logical product signals being a logical product of said NRZ electrical signal and one of pre-coded complementary NRZ signals; a pair of power sum means for providing power sum of one output of one of said complementary logical product means and a complementary output of the other complementary logical product means, and an optical intensity modulation means for modulating said optical clock pulse with outputs of said power sum means so that phase of an optical output signal corresponding to first level of said power sum signal is inverted from phase of an optical output signal corresponding to third level of said power sum signal.

According to still another embodiment of the present invention, an optical transmission system has an input terminal which receives NRZ (non-return-to-zero) electrical signal, and electrical-optical conversion means which receives said NRZ electrical signal and converts the same to RZ (return-to-zero) optical signal, wherein said electrical-optical conversion means comprises; a first optical intensity modulation means for modulating continuous optical signal with optical clock signal; a second optical intensity modulation means for modulating an output of said first optical intensity modulation means with said NRZ electrical signal; pre-code means receiving an NRZ electrical signal and providing a pre-coded signal which is an exclusive-OR signal of said NRZ electrical signal and delayed signal of said exclusive-OR signal by one bit, and an optical phase modulation means for modulating phase of an output of said second optical intensity modulation means with an output of said pre-code means so that phase of an optical pulse of said second optical intensity modulation means is inverted alternately pulse by pulse.

BRIEF DESCRIPTION OF THE DRAWINGS

The foregoing and other objects, features, and attendant advantages of the present invention will be appreciated as the same become better understood by means of the following description and accompanying drawings wherein;

FIG. 7 shows experimental waveforms of RZ optical signals generated by the present optical transmission system, FIG. 14 shows operational waveforms in the device of FIG. 12, FIG. 23 shows operational waveforms of the device of FIG. 20.

DESCRIPTION OF THE PREFERRED EMBODIMENTS

The embodiments of the present invention are now described in accordance with FIG. 1, FIG. 10, FIG. 12, FIG. 20 and FIG. 26.

Figure 1:
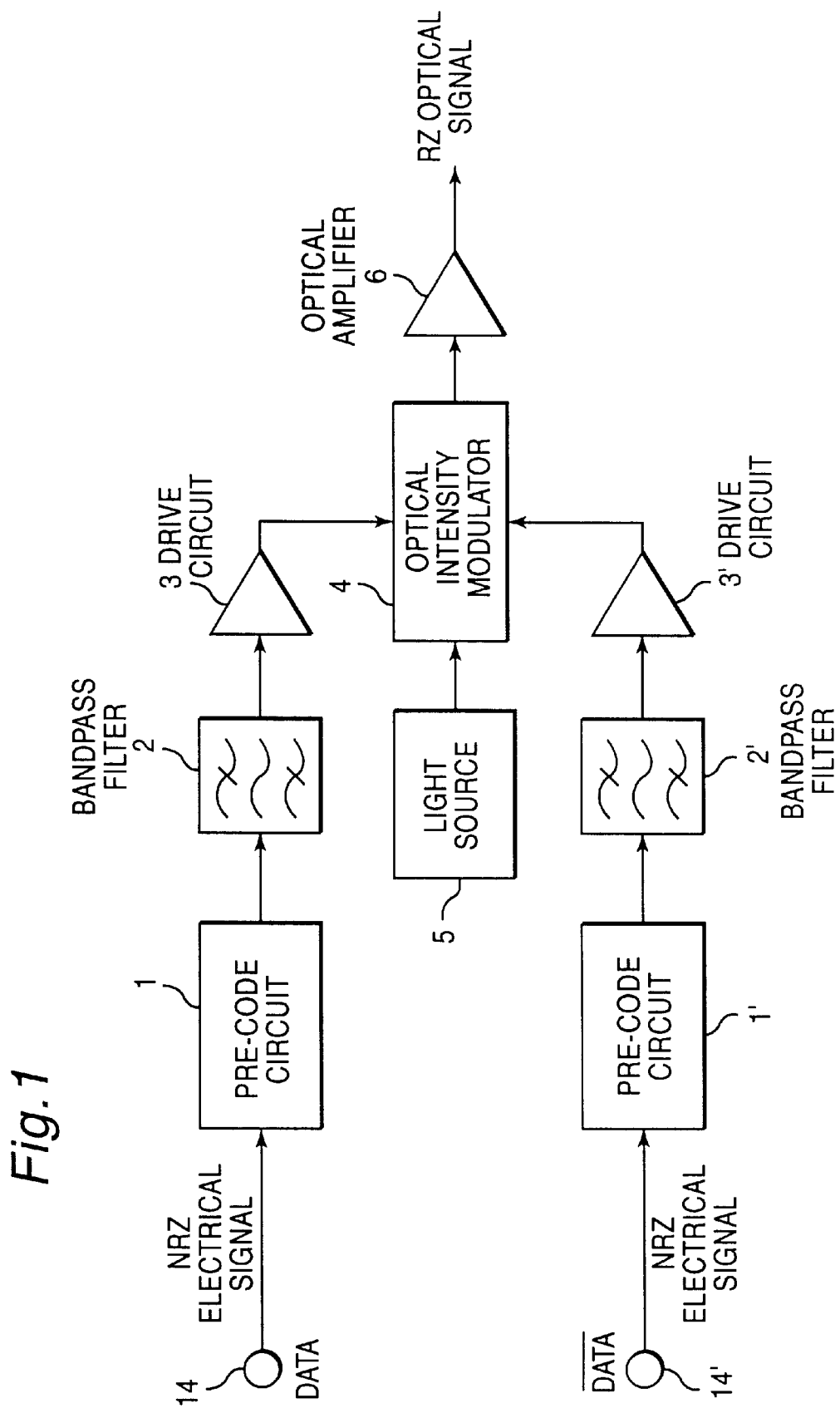
FIG. 1 is a block diagram of a first embodiment of the present optical transmission system.
Figure 10:
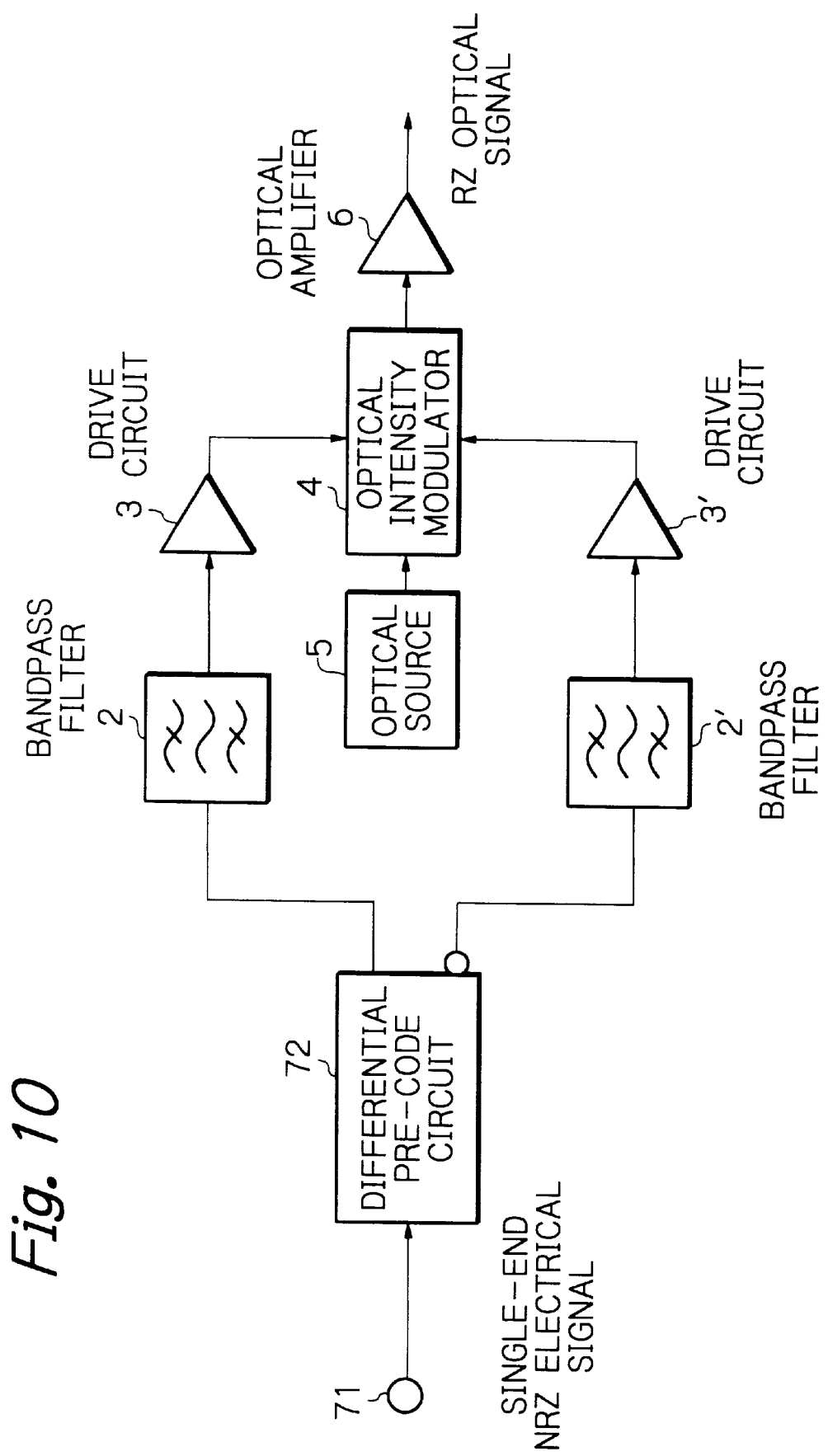
FIG. 10 is a block diagram of a second embodiment of the present optical transmission system.
Figure 12:
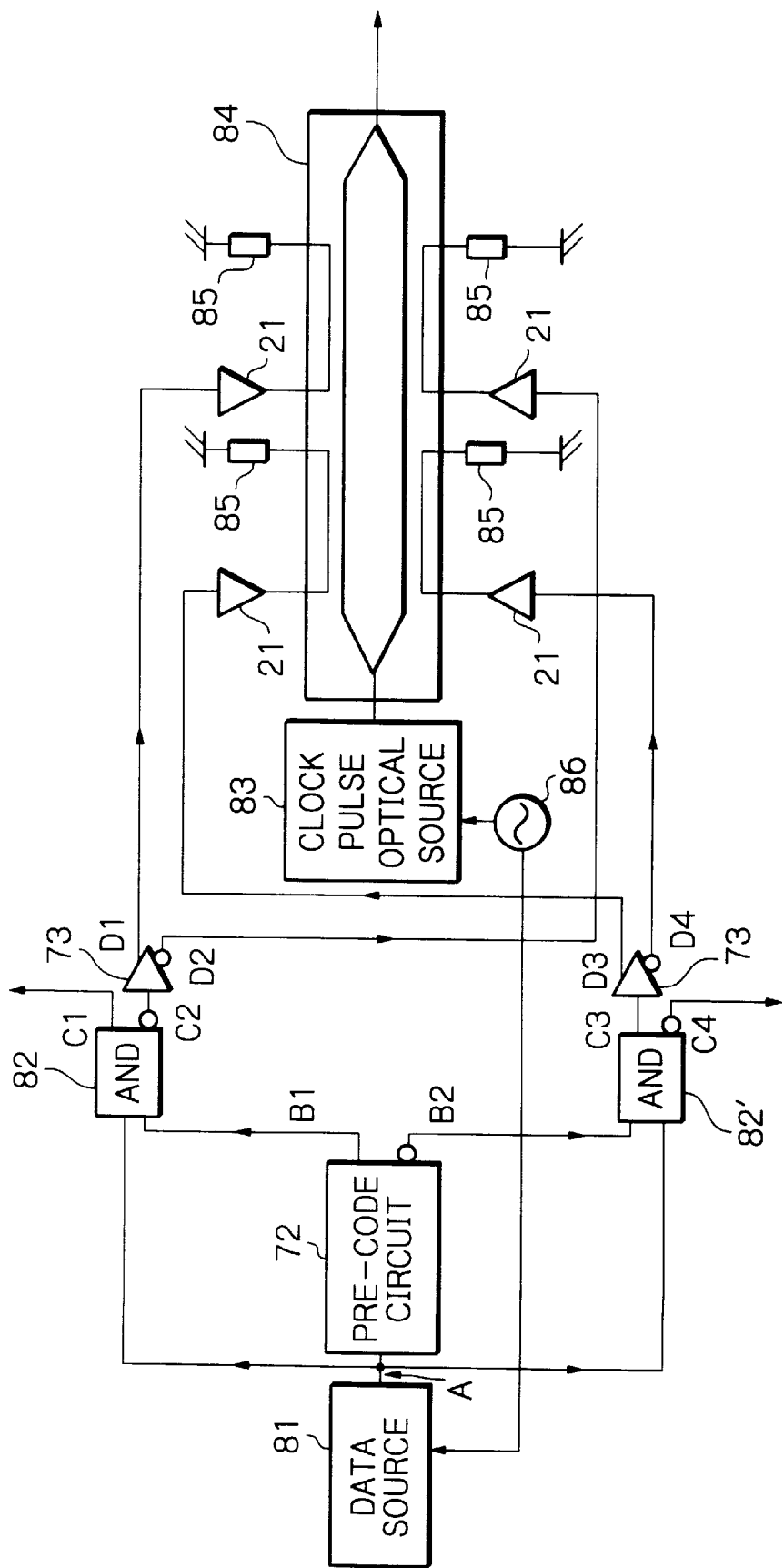
FIG. 12 is a block diagram of a third embodiment of the present optical transmission system.
Figure 20:
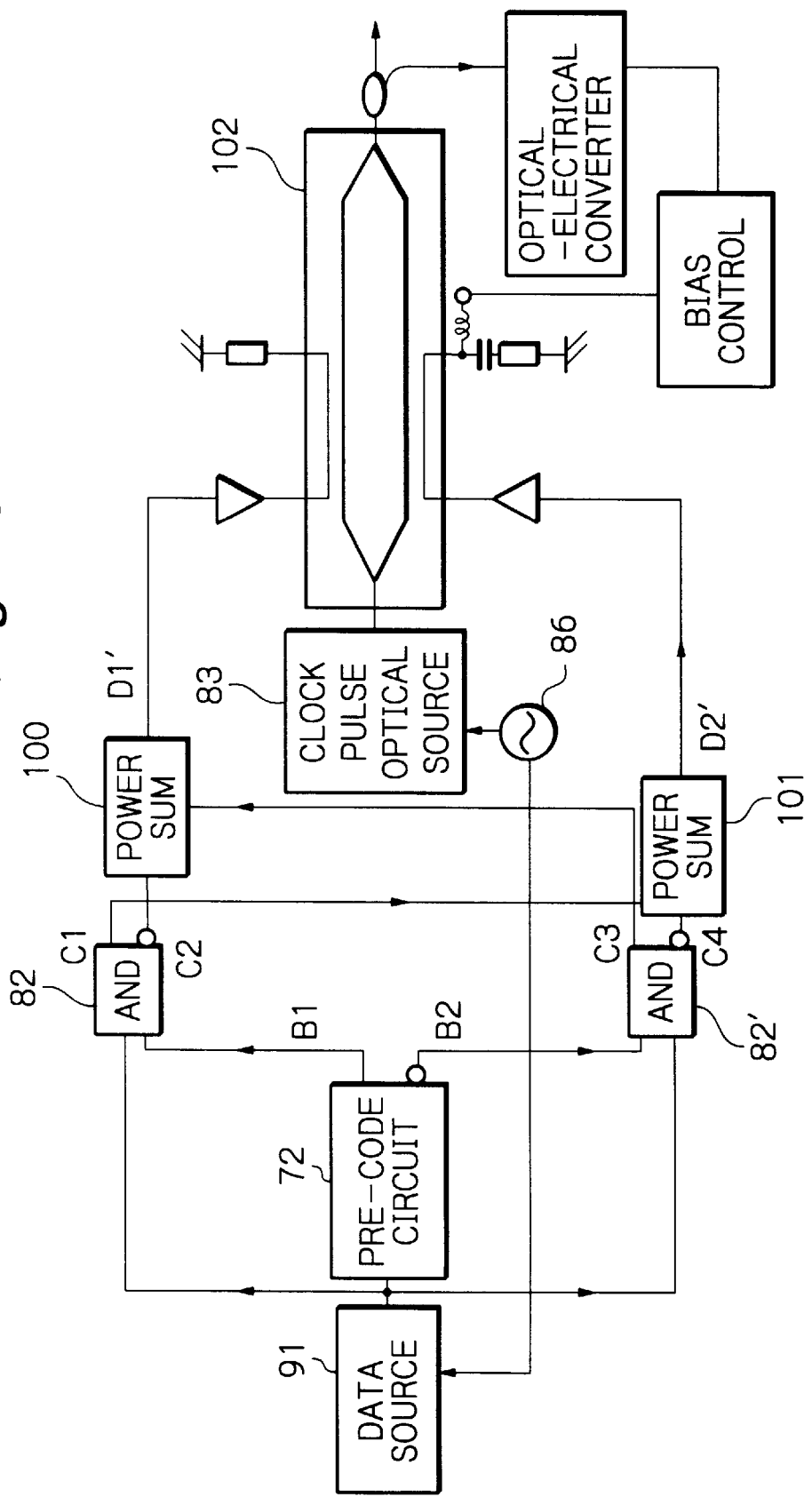
FIG. 20 is a block diagram of a fourth embodiment of the present optical transmission system.
Figure 26:
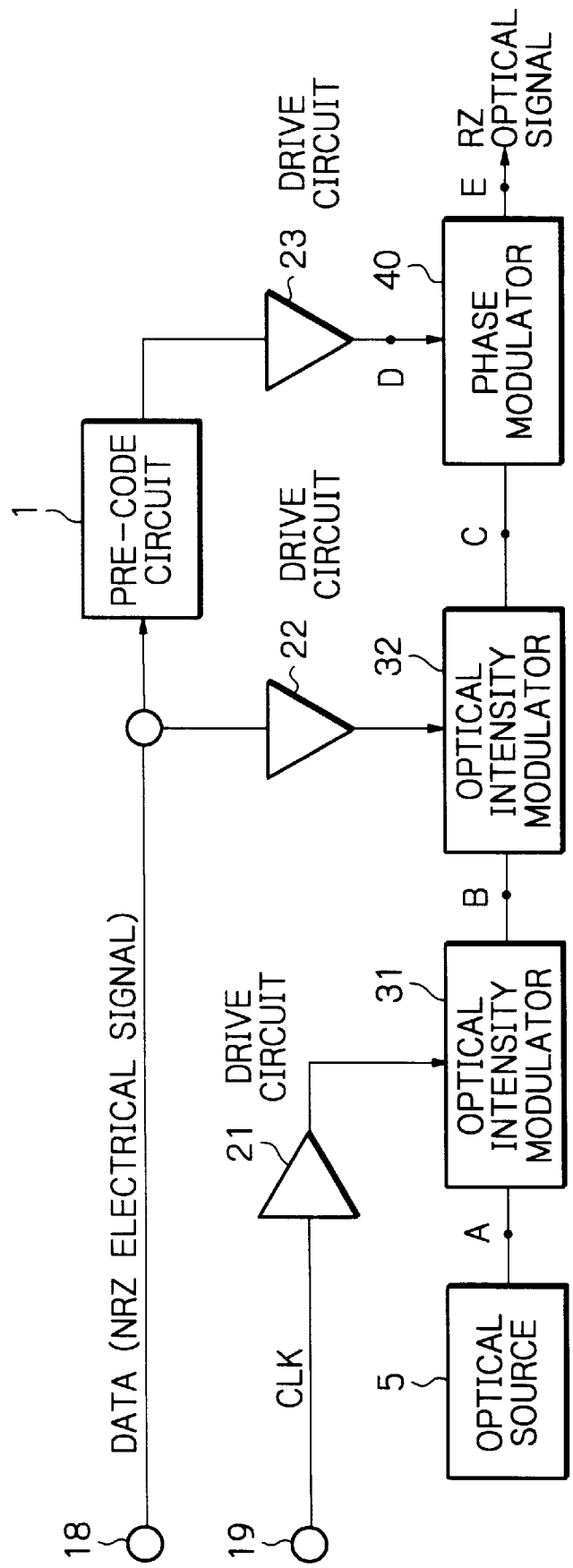
FIG. 26 is a block diagram of a fifth embodiment of the present optical transmission system.

FIG. 1 is a block diagram of a first embodiment of the present optical transmission system. FIG. 10 is a block diagram of a second embodiment of the present optical transmission system. FIG. 12 is a block diagram of a third embodiment of the present optical transmission system. FIG. 20 a block diagram of a fourth embodiment of the present optical transmission system. FIG. 26 is a block diagram of a fifth embodiment of the present optical transmission system.

The first embodiment of the present invention is, as shown in FIG. 1, an optical transmission system having a pair of input terminals 14 and 14' for receiving NRZ electrical signal, and conversion means for converting said NRZ electrical signal applied to the input terminals into RZ optical signal.

The feature of the first embodiment is that said conversion means comprises a pair of pre-code circuits 1 and 1' which provide exclusive-OR operation between said NRZ complementary or differential electrical signal and delayed exclusive-OR signal by one bit, a pair of bandpass filters 2 and 2' which operate as a differentiation circuit for providing differentiation pulses having opposite polarities at a rising edge and a falling edge of an output of an exclusive-OR circuit, and an optical intensity modulator 4 which folds a ternary differentiated pulse along the second level of the differentiated pulse, and modulates continuous optical signal with the differentiated pulse so that phase relating to the first level is opposite to that relating to the third level. The optical intensity modulator 4 comprises a Mach Zehnder optical intensity modulator.

The second embodiment of the present invention is, as shown in FIG. 10, an optical transmission system having an input terminal 71 which receives NRZ electrical signal, and conversion means which converts electrical signal at the terminal 71 to RZ optical signal.

The feature of the second embodiment is that said conversion means comprises a complementary or differential output pre-code circuit 72 which receives an NRZ electrical signal in single end form at an input terminal 71 and performs exclusive-OR operation between said NRZ electrical signal and delay signal of said exclusive-OR signal by one bit, a pair of bandpass filters 2 and 2' each of which operates as a differentiation means for producing a differentiated pulse having opposite polarities at a rising edge and a falling edge of an output of the exclusive-OR circuit, and an optical intensity modulator 4 which folds a ternary differentiated pulse along the second level of the differentiated pulse, and modulates continuous optical signal with the first level and the third level of the differentiated pulse so that phase relating to the first level is opposite to that relating to the third level. The optical intensity modulator 4 comprises a Mach Zehnder optical intensity modulator.

The third embodiment of the present invention is, as shown in FIG. 12, an optical transmission system having an input terminal 81 which receives NRZ electrical signal and conversion means for converting electrical signal at the input terminal 81 to RZ optical signal.

The feature of the third embodiment is that said conversion means comprises means for generating clock electrical signal to which input NRZ electrical signal is synchronized, a clock pulse optical source which generates optical clock pulse synchronized with said clock electrical signal, a pre-code means which accepts NRZ electrical signal in single end form and provides an exclusive-OR signal between said NRZ electrical signal and delayed signal of said exclusive-OR signal by one bit in complementary or differential form, a pair of complementary logical product means for providing logical product of an NRZ electrical signal and pre-coded NRZ electrical signal in complementary form, and an optical intensity modulation means which receives said optical clock pulse, and modulates the same in amplitude and phase independently with an output of said complementary logical product means by using two modulation sections arranged in series and isolated electrically from each other so that an output optical pulse has opposite phase for each mark bit.

The fourth embodiment of the present invention is, as shown in FIG. 20, an optical transmission system having an input terminal 91 which receives an NRZ electrical signal, and conversion means for converting said NRZ electrical signal applied to the input terminal 91 to RZ optical signal.

The feature of the fourth embodiment is that said conversion means comprises; clock electrical signal generation means for providing clock electrical signal with which said NRZ electrical signal is synchronized; clock pulse optical source receiving said clock electrical signal and providing optical clock pulse synchronized with said clock electrical signal; pre-code means receiving an NRZ electrical signal in single-end form and providing a pre-coded signal in complementary or differential form which is an exclusive-OR signal of said NRZ electrical signal and delayed signal of said exclusive-OR signal by one bit; a pair of complementary logical product means for providing logical product signals in complementary form, each of said logical product signals being a logical product of said NRZ electrical signal and one of pre-coded complementary NRZ signals; a pair of power sum means for providing power sum of one output of one of said complementary logical product means and a complementary output of the other complementary logical product means; and an optical intensity modulation means for modulating said optical clock pulse with outputs of said power sum means so that phase of an optical output signal corresponding to first level of said power sum is inverted from phase of an optical output signal corresponding to third level of said power sum.

The fifth embodiment of the present invention is, as shown in FIG. 26, an optical transmission system having an input terminal 18 which receives an NRZ electrical signal, and conversion means which converts the NRZ electrical signal at the input terminal 18 to RZ optical signal.

The feature of the fifth embodiment is that said conversion means comprises a first optical intensity modulation means 31 for modulating continuous optical signal with electrical clock signal at the input terminal 19; a second optical intensity modulation means 32 for modulating an output of said first optical intensity modulation means with said NRZ electrical signal; pre-code means 1 receiving an NRZ electrical signal and providing a pre-coded signal which is an exclusive-OR signal of said NRZ electrical signal and delayed signal of said exclusive-OR signal by one bit; and an optical phase modulation means 40 for modulating phase of an output of said second optical intensity modulation means with an output of said pre-code means so that phase of an every marked optical pulse of said second optical intensity modulation means is inverted alternately.

First Embodiment

First embodiment of the present invention is described in accordance with FIGS. 1 through 9.

In FIG. 1, an NRZ (non-return-to-zero) electrical signal in complementary or differential form is applied to a pair of input terminals 14 and 14'. The NRZ electrical signal carries multiplexed modulation signals.

The NRZ electrical signal on the terminals 14, 14' is applied to respective pre-coding circuits 1 and 1' which provide pre-coded NRZ signal. An output of said pre-coding circuits is applied to respective bandpass filters 2 and 2', each of which operates as a differentiation circuit for generating differentiation pulses having opposite polarities and the same amplitude as each other from the ground level at a rising edge and a falling edge of each pre-coded pulse. The numerals 3 and 3' are an AC-coupled type driver for amplifying differentiated signal to the level enough to operate an optical intensity modulator 4. The modulator 4 is a push-pull type Mach-Zehnder intensity modulator which receives differentiated signals in complementary form to generate modulated RZ (return-to-zero) optical signal. The numeral 6 is an optical amplifier to amplify an output of the intensity modulator 4 to provide amplified optical signal in RZ form to an optical transmission line.

A pair of pre-code circuits and a pair of bandpass filters may be implemented by a bipolar code converter providing a pair of complementary outputs.

Figure 2:
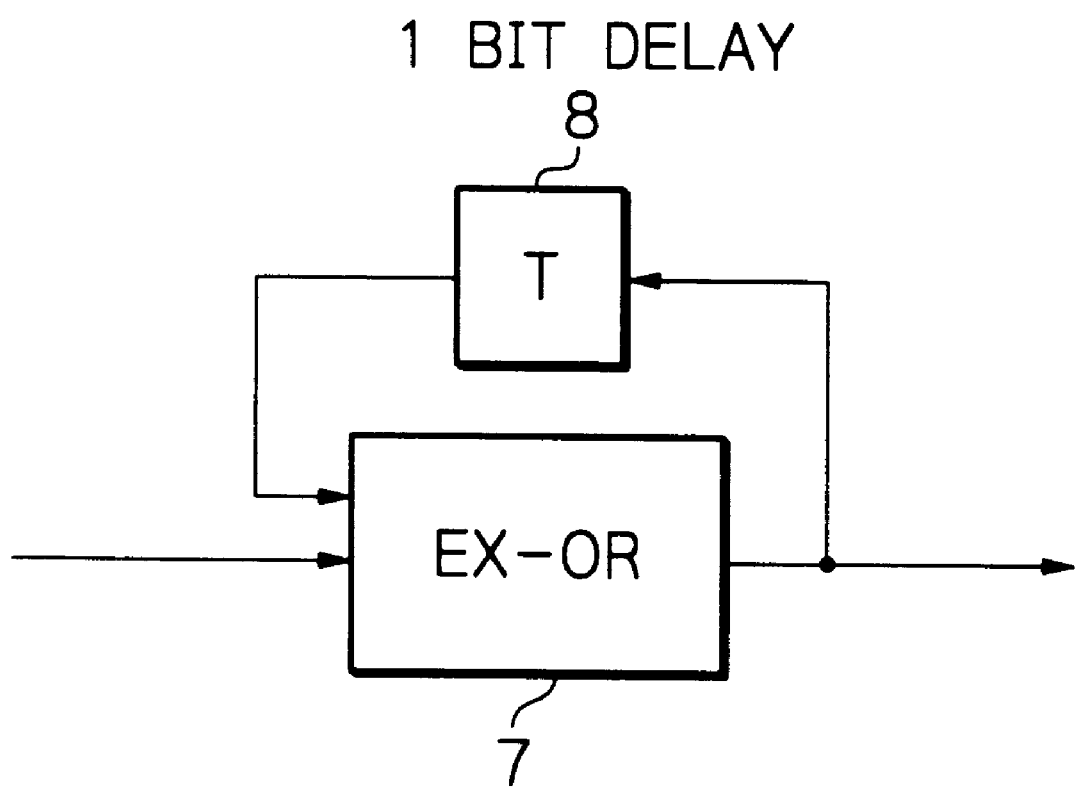
FIG. 2 shows a circuit diagram of a pre-code circuit.

FIG. 2 is a block diagram of a precode circuit which comprises an exclusive OR circuit 7 and a one bit delay circuit 8 with an input coupled with an output of the exclusive OR circuit 7 and an output coupled with an input of the exclusive OR circuit 7.

Figure 3:
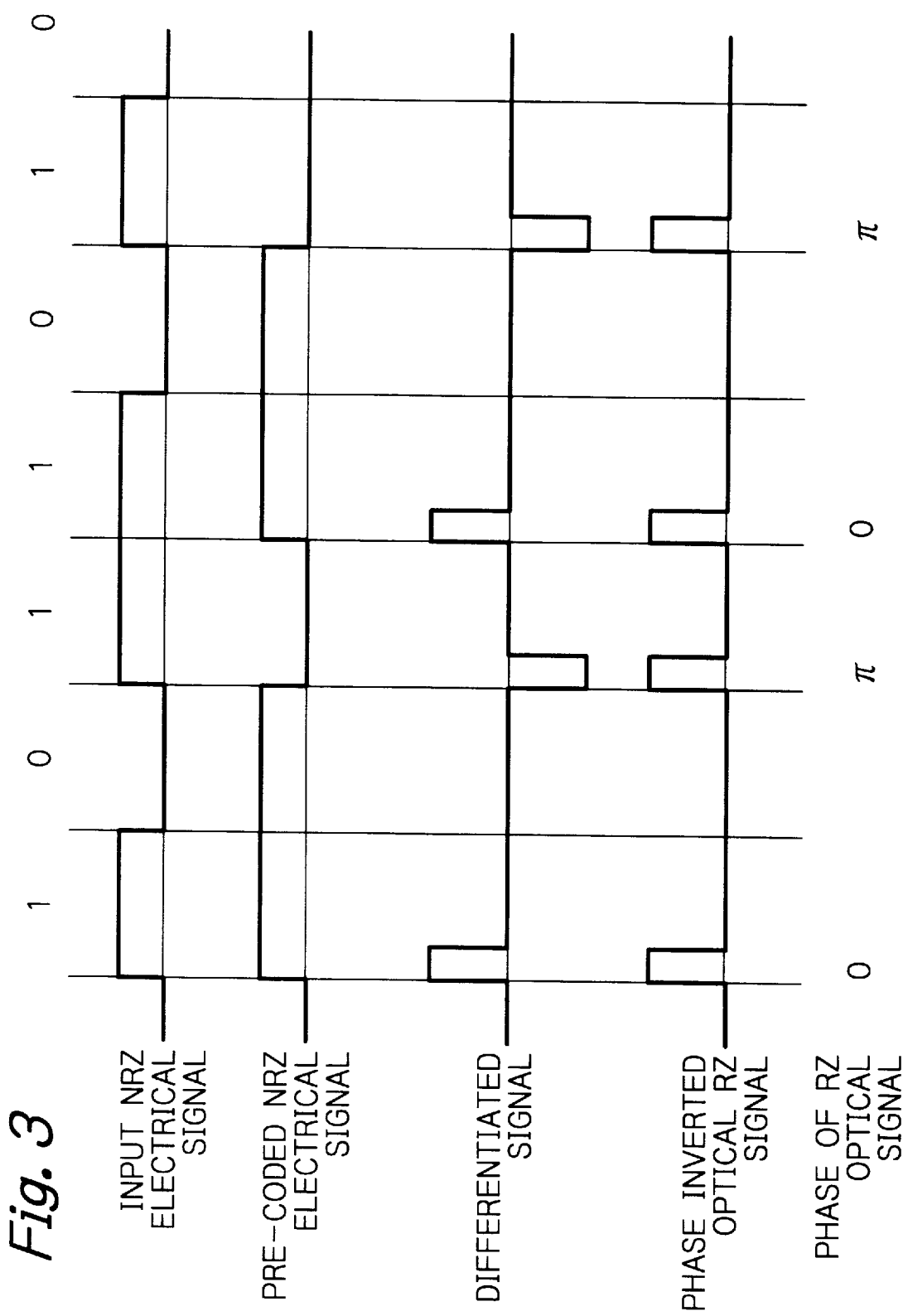
FIG. 3 shows operational waveforms of the device of FIG. 1.

FIG. 3 shows wave-forms of each portions of the circuit 1.

Figure 29:
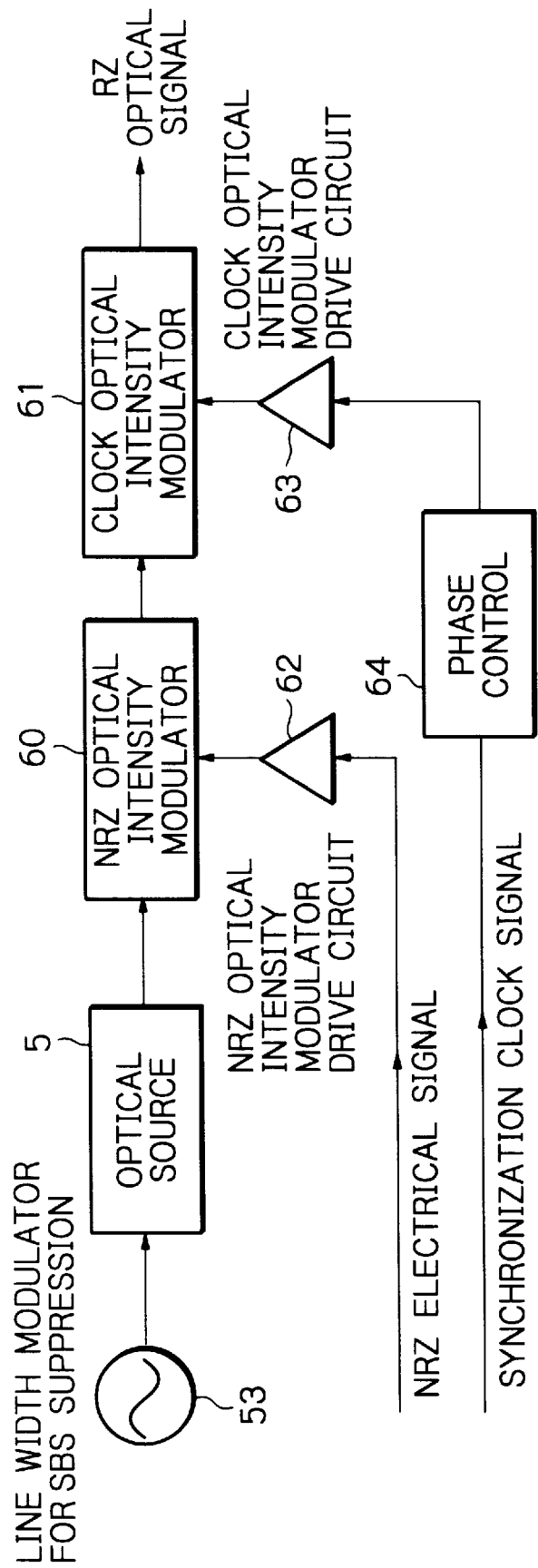
FIG. 29 is a block diagram of another prior optical transmission system.
Figure 30:
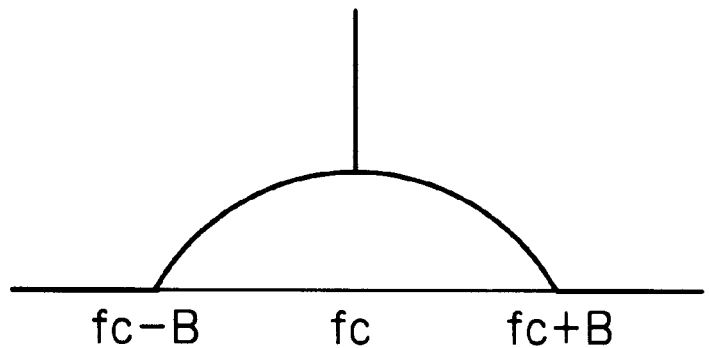
FIG. 30 shows spectrum of NRZ optical signal in a prior optical transmission system.
Figure 31:
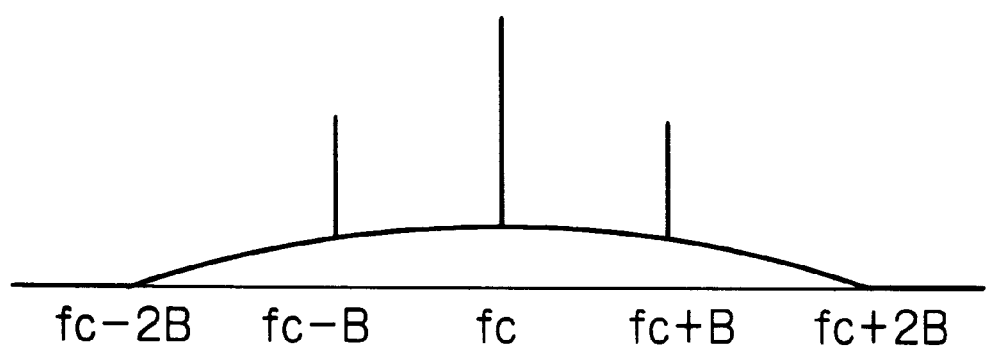
FIG. 31 shows spectrum of RZ optical signal in a prior art.

The present invention has the following four advantages.
1) An input electrical NRZ signal is processed by a pre-code circuit, and then, converted to differentiated form by using a passive microwave component. Therefore, a drive signal applied to an optical modulator 4 is ternary balanced signal which includes no D.C. component. Therefore, a drive circuit 3 (3') is not necessary to have baseband amplification characteristics from D.C. level, and the 3 dB bandwidth is only half (=B Hz) of that of a prior art.
2) A prior modulation scheme shown in FIG. 29 which amplifies RZ electrical signal directly suffers from D.C. level fluctuation of a drive signal due to mark ratio change when an AC-coupled type driver is used, thus, the AC-coupled drive circuit must have an output dynamic range that is twice as large as that required for DC-coupled type driver, and further, a control circuit is essential for compensating bias point of an optical intensity modulator 4 according to mark ratio.

Figure 4:
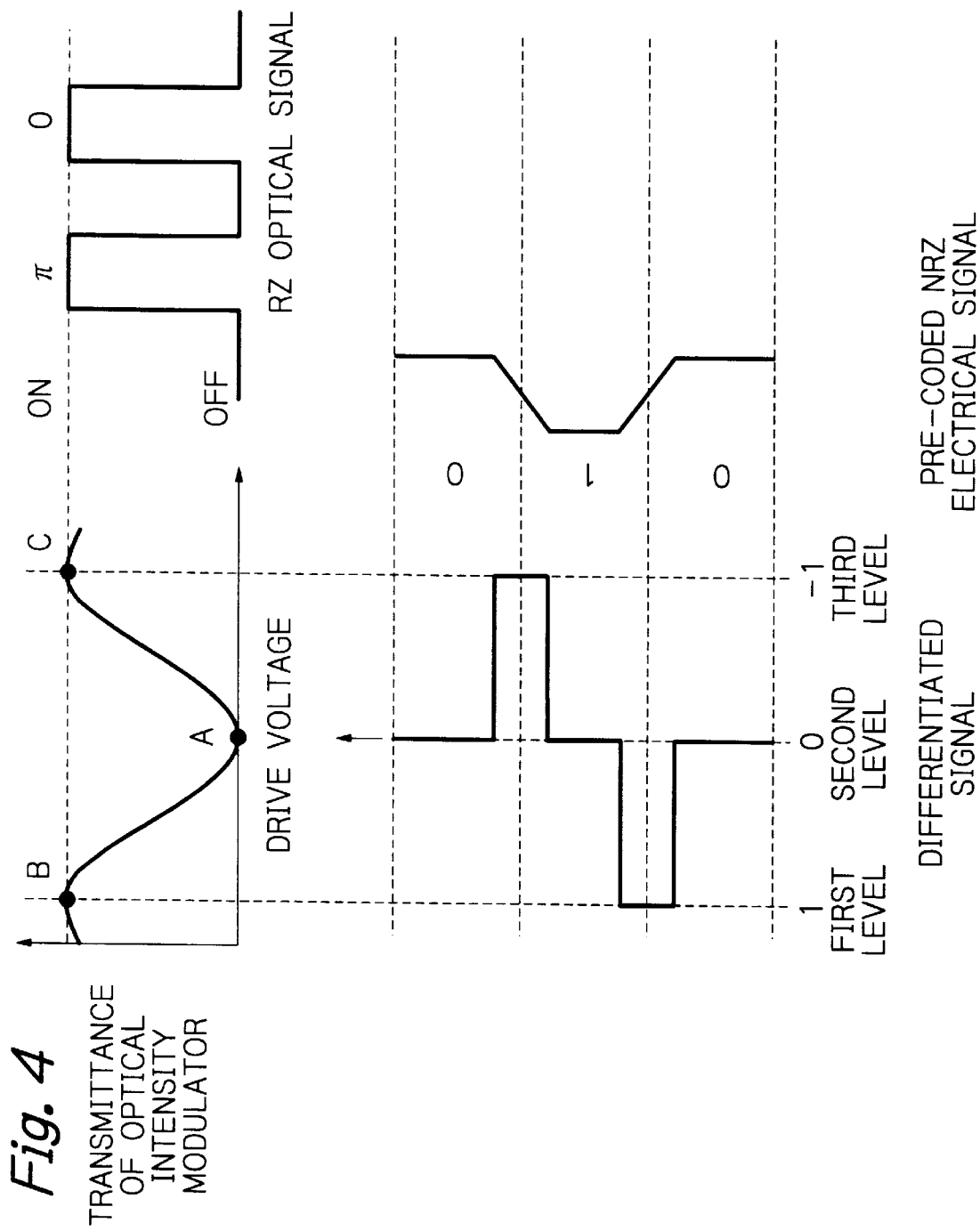
FIG. 4 shows the operation of an optical intensity modulator in the present invention.
Figure 5:
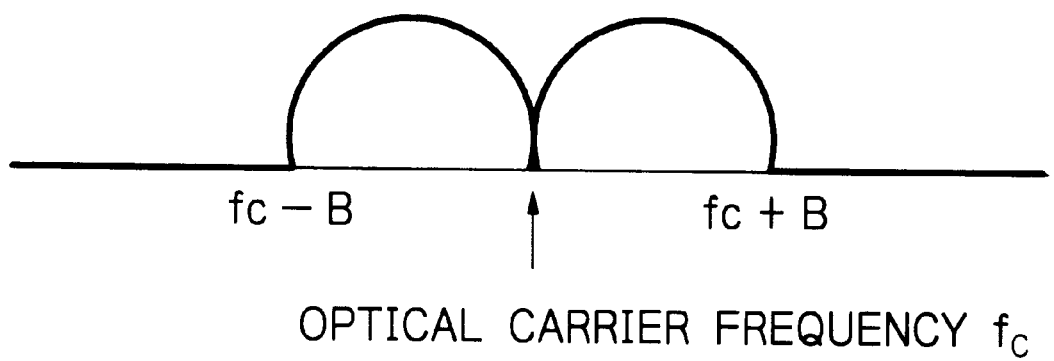
FIG. 5 shows optical spectrum of RZ optical signal generated by the present optical transmission system.

The differentiated signal according to the present invention includes no D.C. component, and therefore, no D.C. level fluctuation due to mark ratio change occurs. Therefore, above disadvantage of a prior art has been solved.
3) FIG. 4 shows the operation of the present optical intensity modulator 4, in which horizontal axis shows drive voltage and vertical axis shows optical intensity. The present invention uses the periodical electrical-optical response characteristics of a push-pull type Mach-Zehnder optical intensity modulator. When the operation point of the optical intensity modulator is selected to the point A as shown in FIG. 4, input electrical pulses having opposite polarities generate a RZ optical signal pulse. In that case, the phase of an optical signal at the point B in FIG. 4 differs from that at the point C by 180° (pi). When the points B and C relate to the rising edge and the falling edge of an NRZ electrical signal, respectively, adjacent RZ optical pulses have the opposite phase with each other. When a ¼ wavelength short stub (for clock frequency B Hz in the transmission rate) is used, the duty ratio of an optical pulse is essentially ½. The bandwidth of a RZ optical signal thus generated is 2B. As the optical modulator 4 has only one stage, the output power required to the optical source 5 is similar to that requested to an NRZ modulator.
4) FIG. 5 shows optical spectrum of a RZ optical signal generated by the present optical transmission system. As the present modulator uses differentiated signals, the probability to be at the point B and the point C of FIG. 4 is ½ each, and therefore, the RZ signal thus generated has no optical carrier component irrespective of mark ratio as shown in FIG. 5, and the spectrum density of a RZ optical signal is lower than that of a prior RZ optical signal spectrum. Therefore, the RZ optical signal power in which the maximum RZ optical signal spectrum density is equal to the threshold density of the Stimulated Brillouin Scattering is higher than a prior RZ optical signal power. Further, as the spectrum density is low in the present invention, when wavelength multiplex system is carried out close to the zero dispersion wavelength of a transmission line, cross talk due to four wave mixing (FWM) which is serious problem in a prior RZ and/or NRZ transmission, is decreased.

Figure 6:
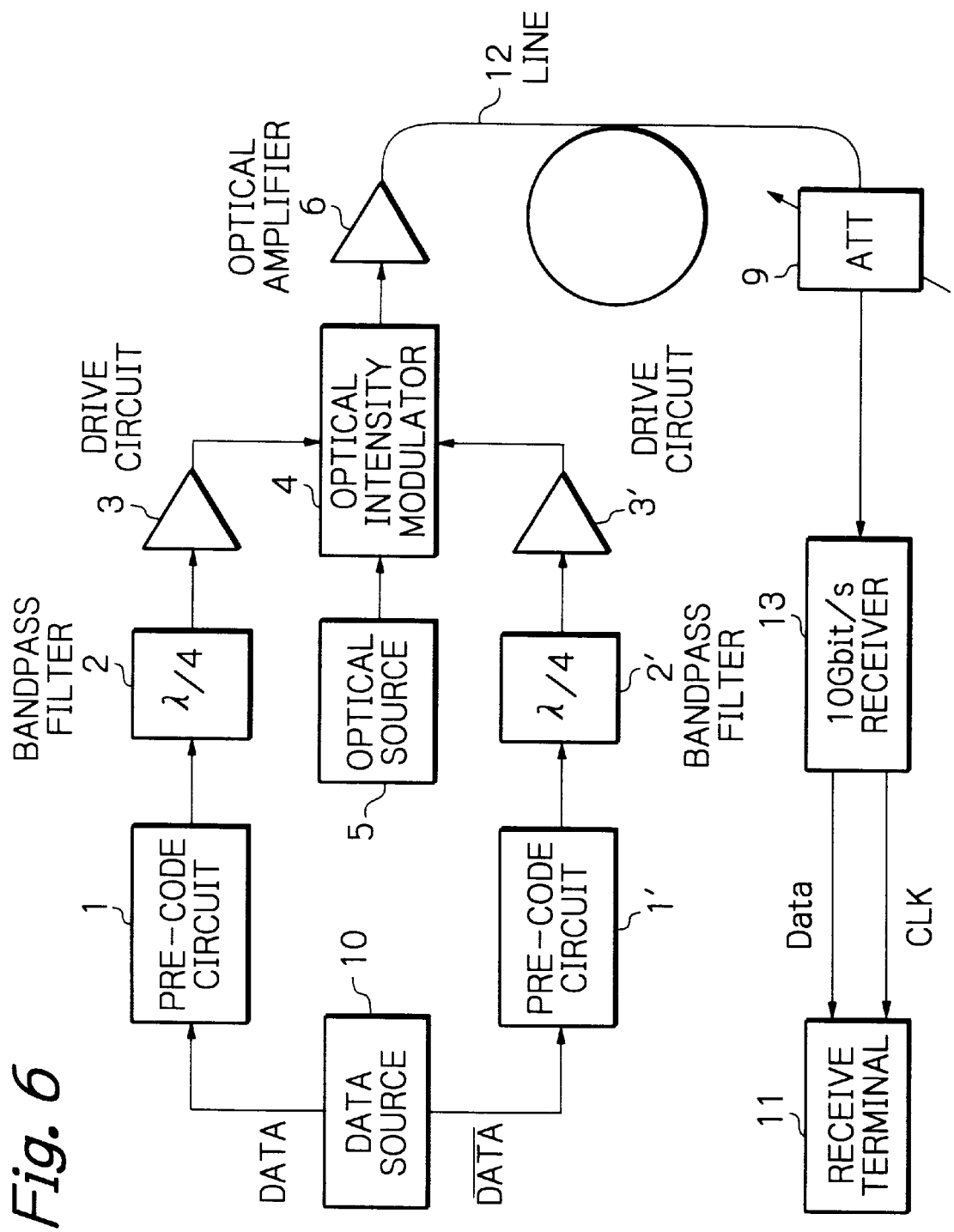
FIG. 6 is a block diagram of an optical transmitter/receiver using the present optical transmission system.

FIG. 6 is a block diagram of an optical transmitter/receiver using the present optical transmission system. FIG. 6 is the embodiment used in the experiment that the transmission rate is 10 G bit/sec, for phase-inverted RZ signal.

A transmit terminal 10 provides complementary NRZ electrical signals which are applied to pre-code circuits 1 and 1'. Outputs of the pre-code circuits 1 and 1' are differentiated by bandpass filters 2 and 2'. The differentiated signals are amplified by the drivers 3 and 3'. The outputs of the drivers 3 and 3' are applied to the optical intensity modulator 4 which provides optical intensity modulation to the continuous optical signal from the single-longitudinal-mode optical source 5. The output of the optical intensity modulator 4 is amplified by the optical amplifier 6, which transmits the optical signal to a receiver through an optical transmission line 12.

In a receiver, a received optical signal is applied to a receiver 13 through an attenuator 9 which restricts amplitude of received optical signal. The receiver 13 re-generates NRZ electrical signal and clock signal, which are applied to a receive terminal 11. The structure and the operation of a receiver are conventional, and do not constitute a part of the present invention.

Bandpass filters 2 and 2' which generate a differentiated signal are implemented by a short circuited ¼ wavelength stub at clock frequency B Hz for transmission rate. Alternatively, it may be implemented by using a conventional bandpass filter. In the present embodiment, the bandwidth of the optical intensity modulator 4 is approximate 8 GHz which is half of that of a prior art, and said optical intensity modulator 4 generates 10 G bit/s phase-inverted RZ optical signal.

FIG. 7 shows an eye pattern of an experimental RZ optical signal according to the present optical transmission system. When mark ratio is changed to ½, ¼ and ⅛, an eye pattern does not change as shown in FIG. 7 and stable RZ optical signal is generated with no use of a D.C. level control circuit.

Figure 8:
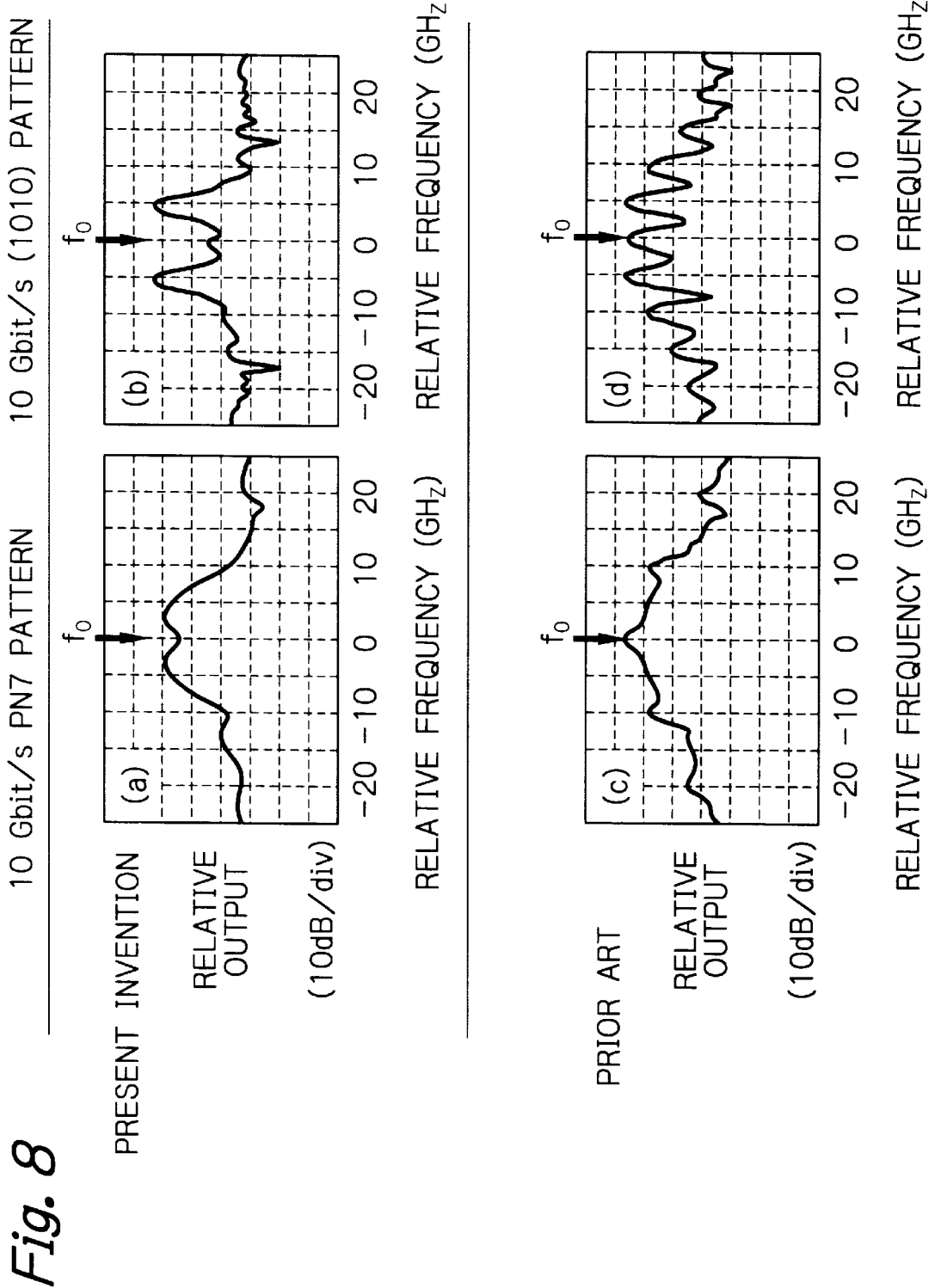
FIG. 8 shows optical spectrum of RZ optical signal according to the present invention, and the prior art.

FIG. 8 shows experimental RZ optical spectrum according to the present invention, together with experimental RZ optical spectrum of a prior art. The horizontal axis shows relative frequency, and the vertical axis shows relative output power. In FIG. 8, it should be noted that no component at $f_0$ exists in the present invention. The bandwidth in the present invention is half as compared with that of a prior art.

Figure 9:
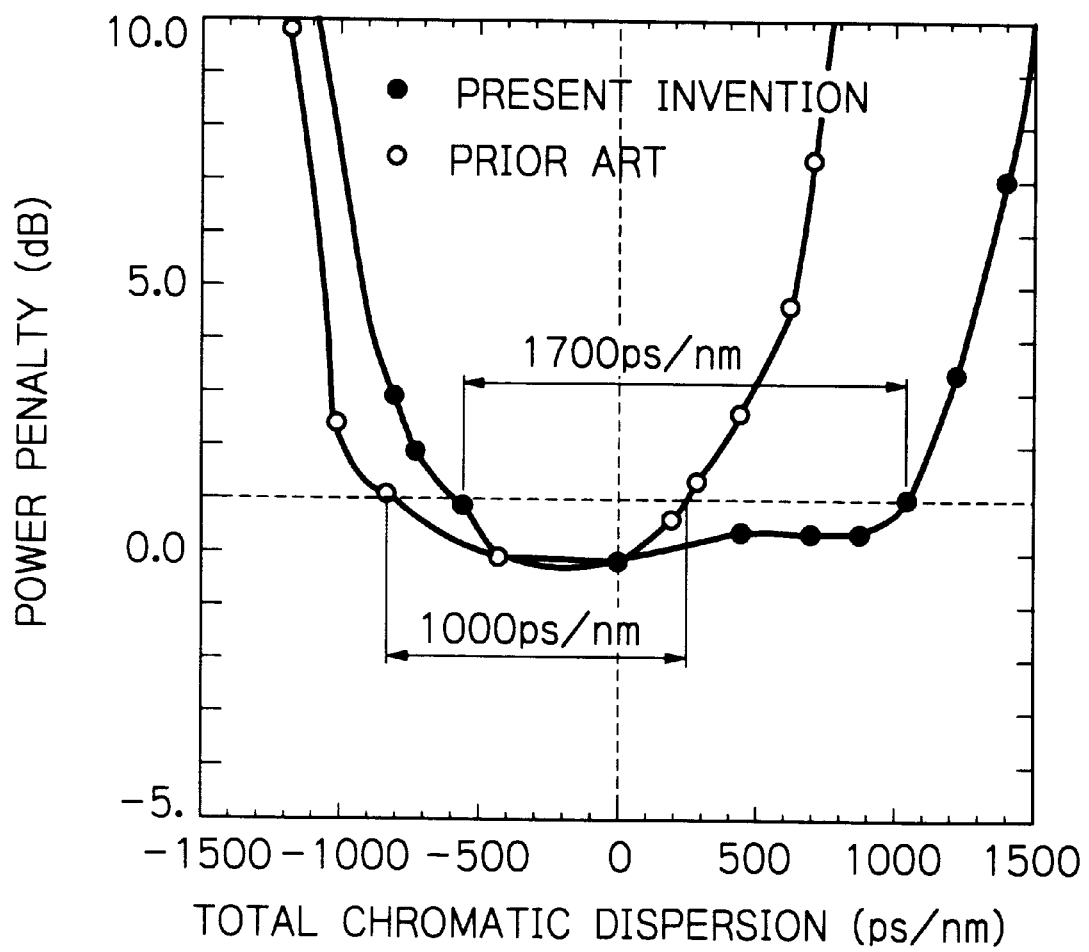
FIG. 9 shows chromatic dispersion tolerance of the present invention and the prior art.

FIG. 9 shows the chromatic dispersion characteristics of the present invention and a prior art. The horizontal axis shows the dispersion (ps/nm), and the vertical axis shows the power penalty (dB). FIG. 9 shows the chromatic dispersion at 10 G bit/s of the present invention and a prior art. The dispersion range which the power penalty is degraded by 1 dB is 1700 ps/nm in the present invention, and 1000 ps/nm in a prior art. Thus, the dispersion range of the present invention is 1.7 times as wide as that of a prior art. Thus, it should be noted that the chromatic dispersion characteristics are improved in the present invention.

Second Embodiment

Figure 11:
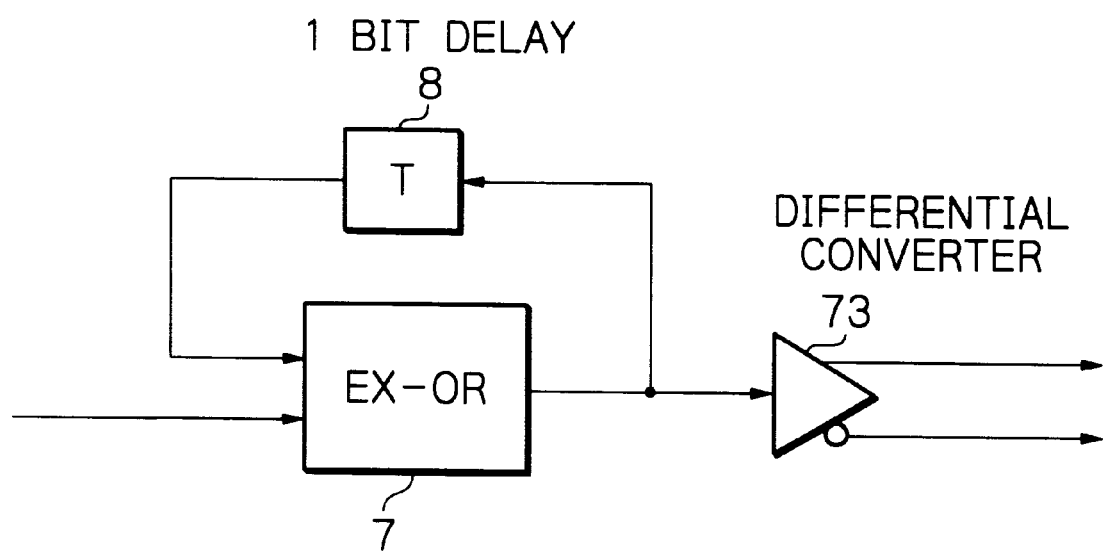
FIG. 11 shows a circuit diagram of a pre-code circuit for the device of FIG. 10.

The second embodiment of the present invention is described in accordance with FIGS. 10 and 11. FIG. 10 is a block diagram of the embodiment according to the present invention, and FIG. 11 shows a pre-code circuit used in the device of FIG. 10. It is assumed in the second embodiment that an input signal is an NRZ electrical signal in single end form, and an output signal of a pre-code circuit is in complementary form as shown in FIG. 10.

A multiplexed NRZ electrical signal in single end form is applied to an input terminal 71. A complementary pre-code circuit 72 receives said NRZ electrical signal and provides pre-coded NRZ electrical signal in complementary form. A pair of bandpass filters 2 and 2' each of which operates as a differentiation circuit receive a pre-coded NRZ electrical signal, and produce differentiated electrical pulse having opposite polarities and the same amplitude around the ground level at a rising edge and a falling edge of an input pulse. A pair of capacitor-coupled type drive circuits 3 and 3' amplitude the differentiated pulse to the level required by an optical intensity modulator 4. A Mach-Zehnder type optical intensity modulator 4 which is in push-pull type produces RZ optical signal according to the amplified differentiated complementary signals. The optical amplifier 6 amplifies an output of the optical intensity modulator 4.

The pre-code circuit 72 comprises, as shown in FIG. 11, an exclusive-OR circuit 7, a one-bit delay circuit 8, and a complementary conversion circuit 73 at an output stage so that pre-coded signal is obtained in complementary form.

Third Embodiment

Figure 13:
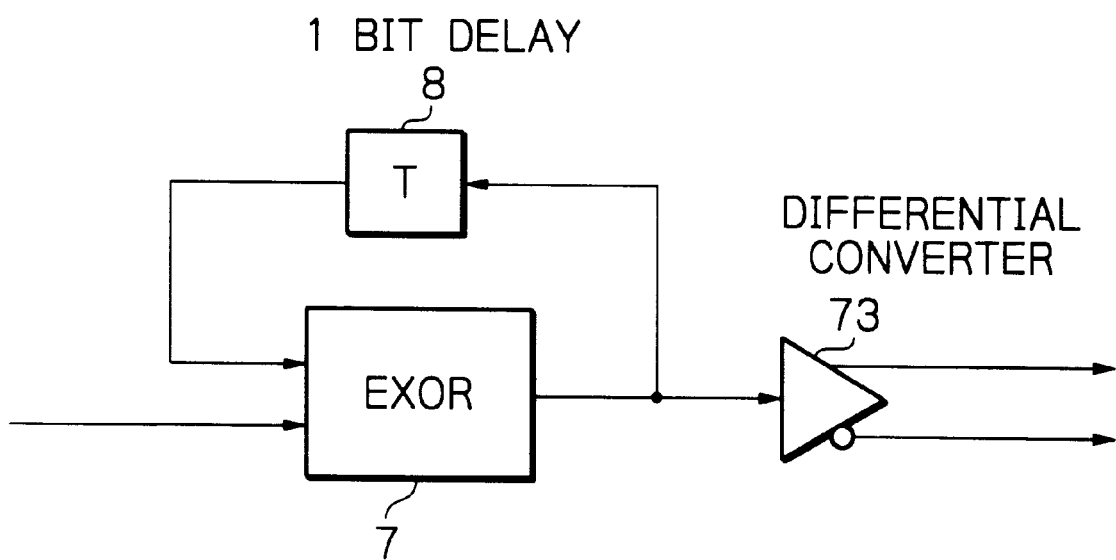
FIG. 13 is a circuit diagram of a complementary pre-code circuit for the device of FIG. 12.
Figure 15:
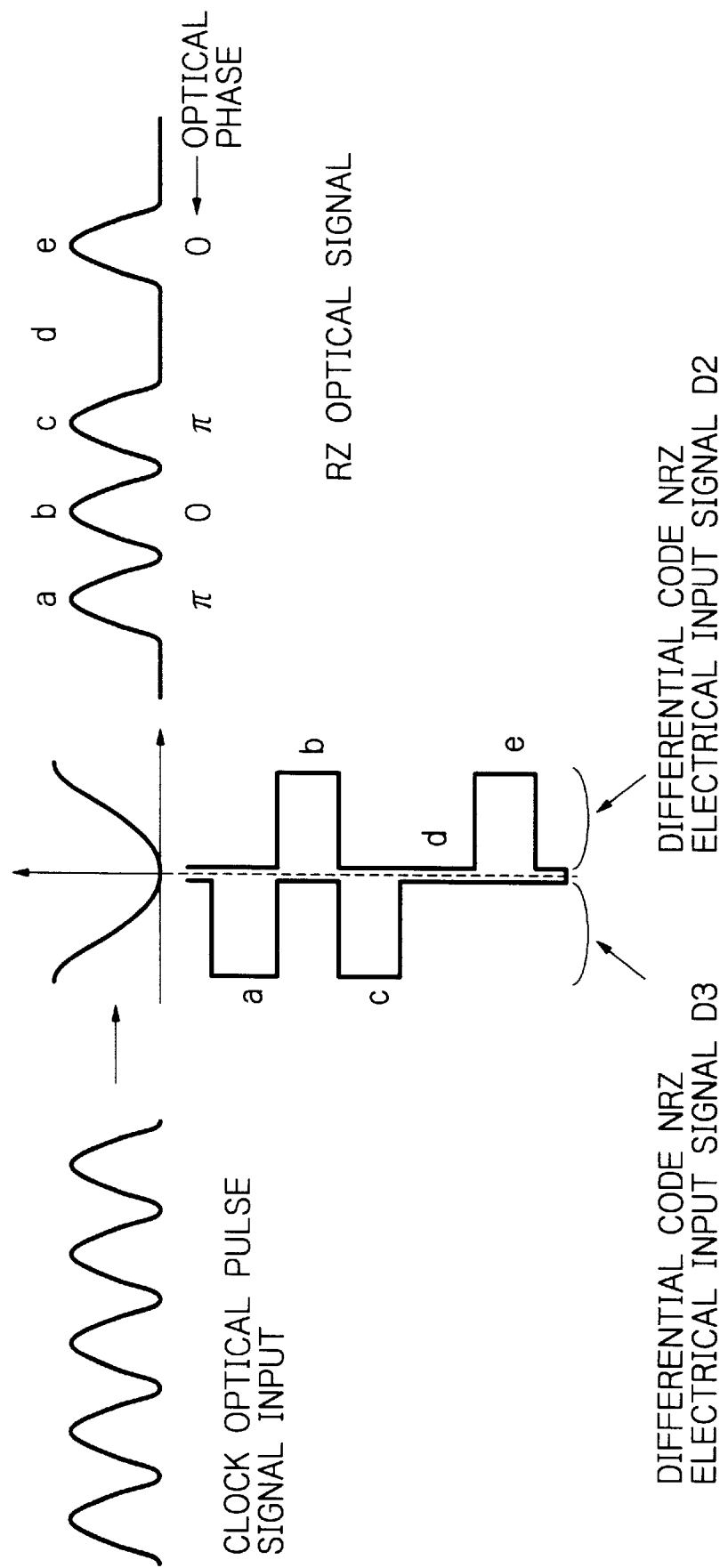
FIG. 15 shows the operation of an optical intensity modulator in FIG. 12.
Figure 16:
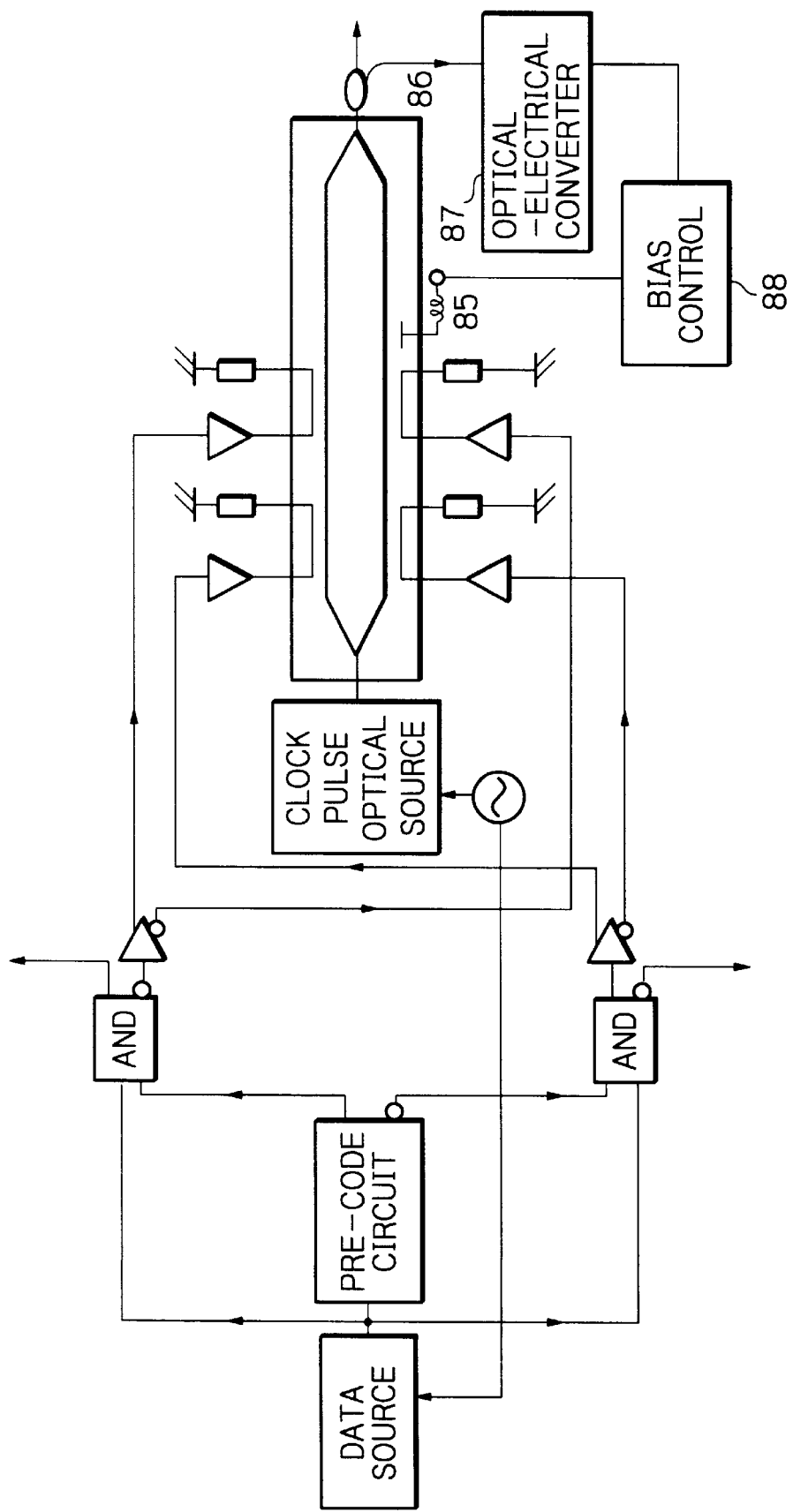
FIG. 16 shows bias control of an optical intensity modulator in FIG. 12.
Figure 17:
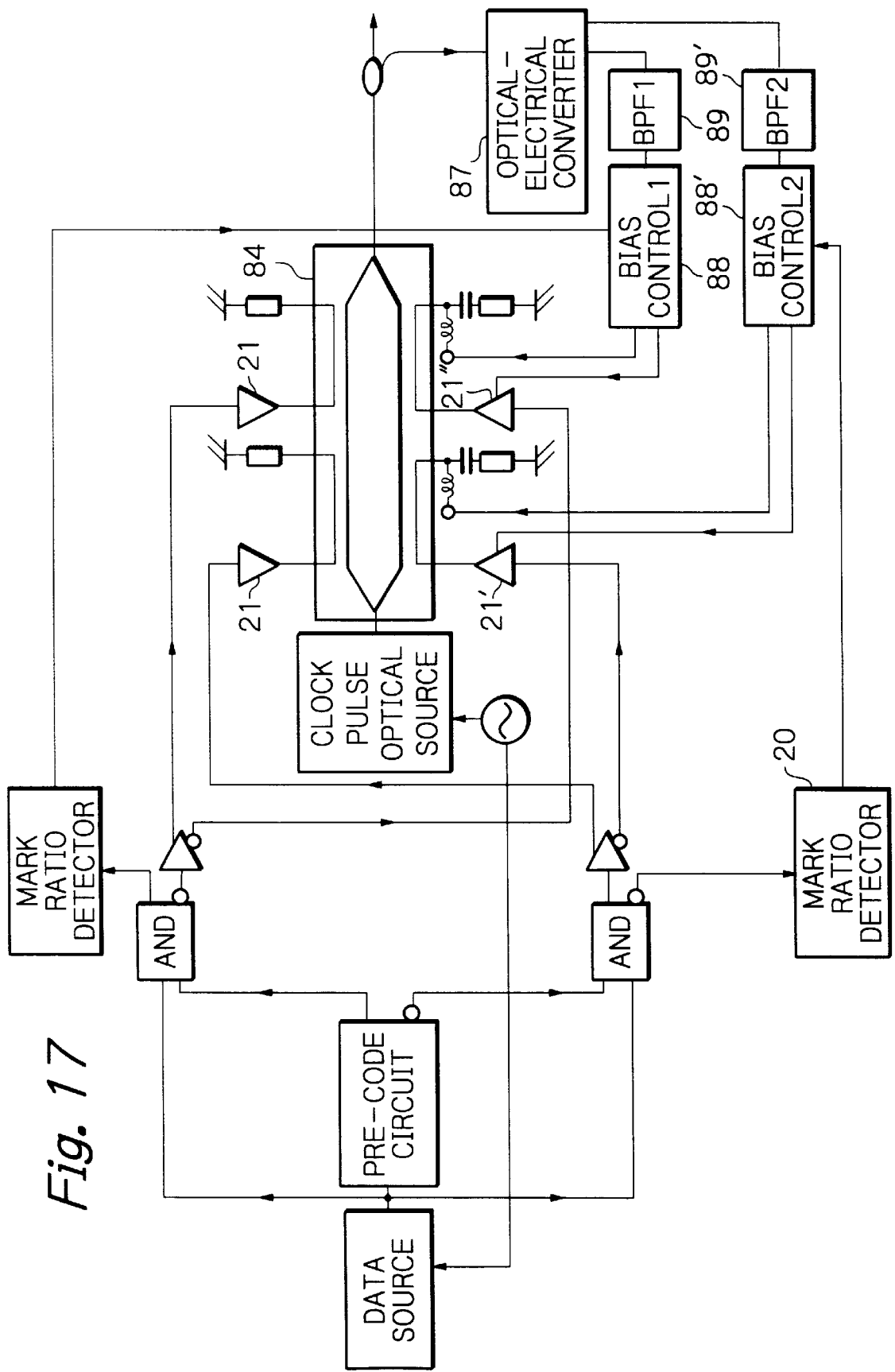
FIG. 17 shows another bias control of an optical intensity modulator in FIG. 12.

The third embodiment of the present invention is described in accordance with FIGS. 12–19. FIG. 12 is a block diagram of an optical transmission system according to the present invention, FIG. 13 shows a circuit diagram of a pre-code circuit used in the device of FIG. 12, FIG. 14 shows operational waveforms in the device of FIG. 12, FIG. 15 shows operational D.C. bias status applied to an optical intensity modulator of the third embodiment. FIGS 16 and 17 show a manner to apply bias voltage to an optical intensity modulator in the third embodiment of the present invention.

In FIG. 12, the numeral 86 is an electrical clock pulse generator for providing electrical clock signal synchronized with an input NRZ signal, the numeral 83 is an optical clock pulse source which provides an optical clock pulse synchronized with said electrical clock pulse, the numeral 81 is signal source which generates a multiplexed NRZ electrical signal in single-end form, the numeral 72 is a complementary pre-code circuit 72 which receives single end NRZ electrical signal from the signal source 81 and provides pre-coded NRZ electrical signal. The numerals 82 and 82' are an AND circuit for providing logical product of an input NRZ electrical signal and a pre-coded NRZ electrical signal. The numeral 73 is a complementary converter for converting an input signal into complementary form. The numeral 84 is an optical intensity modulator.

The current embodiment has the feature that all the electrical signals are NRZ signals in binary form, but not ternary form, and modulated RZ optical output has less pattern jitter as the modulator modulates an optical pulse train which has less pattern jitter.

An input NRZ electrical signal is applied to a pre-code circuit 72, which provides complementary outputs B1 and B2 being inverted for each mark of the input NRZ electrical signal. The AND circuits 82 and 82' provide logical product of an input electrical signal A and a pre-coded NRZ electrical signal (B1, B2) to provide output signals C2 and C3. The signals C2 and C3 have a mark alternately for each mark of an input NRZ electrical signal. An optical intensity modulator 84 in FIG. 12 is a MZ (Mach-Zehnder) intensity modulator, having a first optical modulation section and a second optical modulation section in push-pull operation. The logical product signals C2 and C3 applied to the optical modulation sections are converted into complementary forms D1/D2 and D3/D4 by a complementary converter. Those signals are biased as shown in FIG. 15, and then, applied to the optical modulation sections in push-pull form. Every time a mark appears in an input NRZ electrical signal, AND circuits 82 and 83 open alternately, so that a first modulation section and a second modulation section operate alternately. As a result, phase of an optical RZ pulse modulated in the first modulation section is off-set by pi (¶) from the phase of an optical RZ pulse modulated in the second modulation section.

FIG. 16 shows the structure for biasing an optical intensity modulator 84. An output power of an optical signal is monitored by an optical-electrical converter 87, and based upon the average of the output optical power, one of the optical waveguides are biased through a bias port 85 which is electrically isolated from the first modulation section and the second modulation section.

Figure 18:
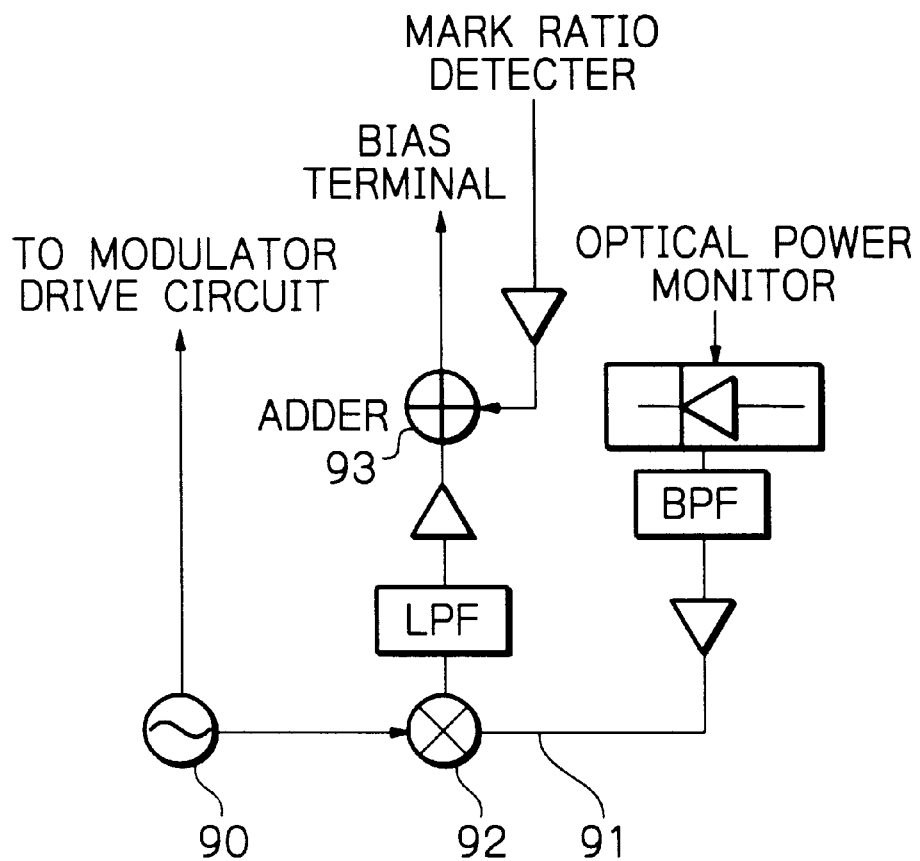
FIG. 18 is an embodiment of a bias control circuit for the device of FIG. 12.
Figure 19:
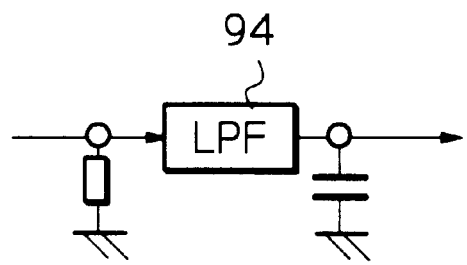
FIG. 19 is a mark ratio detector for the device of FIG. 12.

FIG. 17 shows another structure for biasing an optical intensity modulator 84. FIG. 18 is a circuit diagram of a bias control circuit, and FIG. 19 is a mark ratio detector.

In FIG. 17, signals applied to drive circuits 21' and 21" for the first modulation section and the second modulation section, respectively, are slightly amplitude-modulated by different frequencies from each other by bias control circuits 88 and 88', respectively, to feed an optical intensity modulator 84. A part of an output of the optical intensity modulator 84 is branched, and is converted to electrical form by an optical-electrical converter 87. Bandpass filters 89 and 89' derive frequency components used in the bias control circuits 88, 88', respectively.

In a bias control circuit in FIG. 18, a mixer 92 detects phase difference between modulation phase of an original modulation frequency signal source 90 and phase of a detected signal 91 and detects direction of change of bias signal, and controls so that an amplitude of a detected signal 91 becomes the minimum. A mark ratio detector detects mark ratio, and corrects bias voltage in FIG. 18, considering duty cycle which has been measured.

Fourth Embodiment

Figure 21:
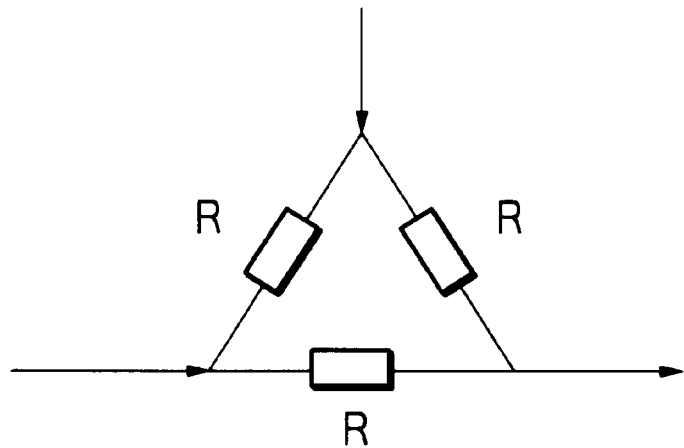
FIG. 21 is a power sum circuit for the device of FIG. 20.
Figure 22:
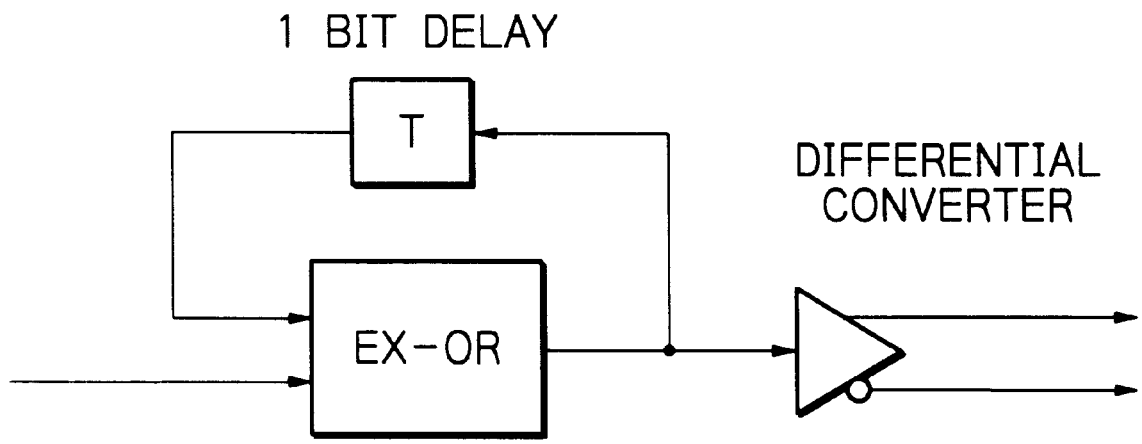
FIG. 22 is a circuit diagram of a complementary pre-code circuit for the device of FIG. 20.
Figure 24:
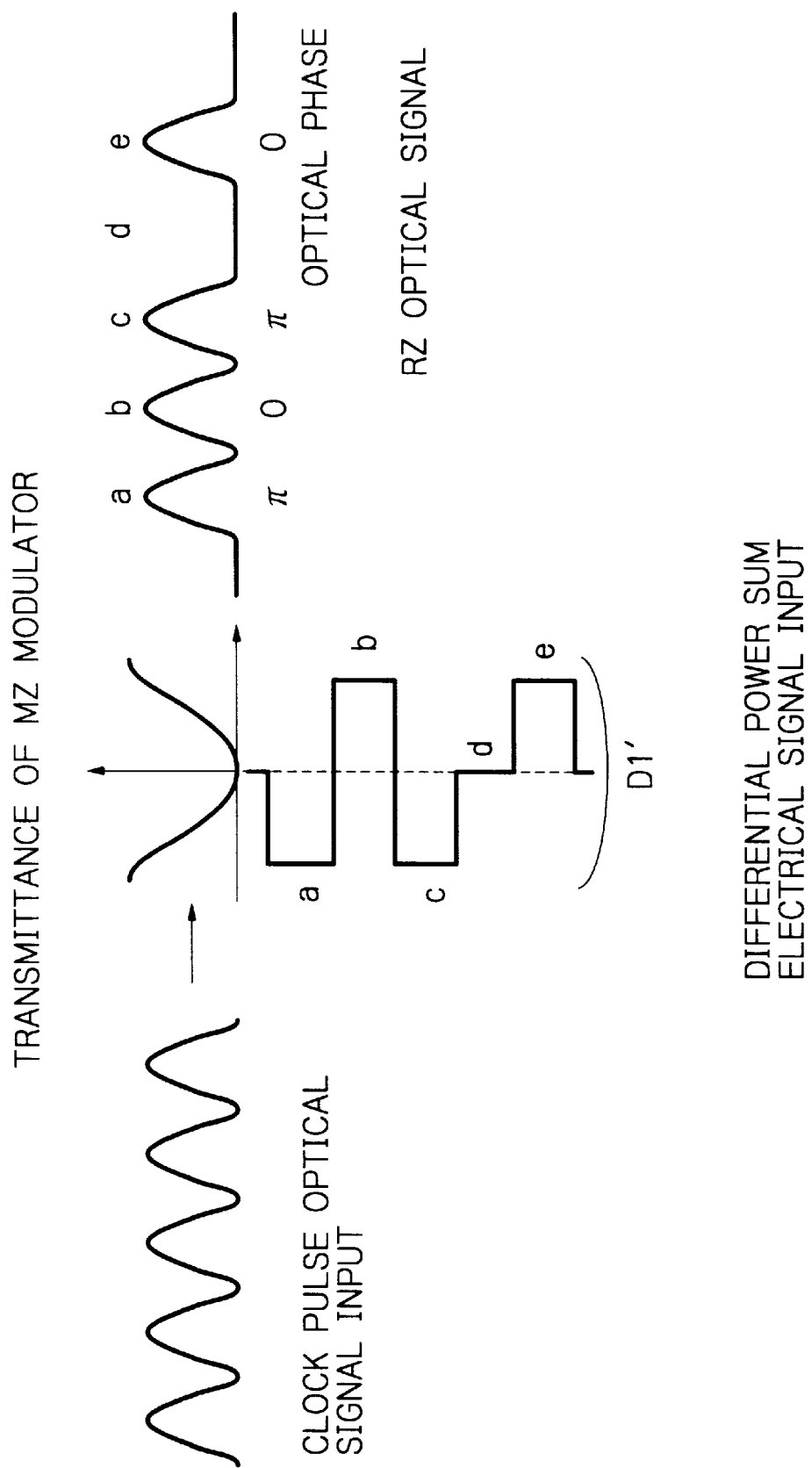
FIG. 24 shows the operation of an optical intensity modulator in FIG. 20.
Figure 25:
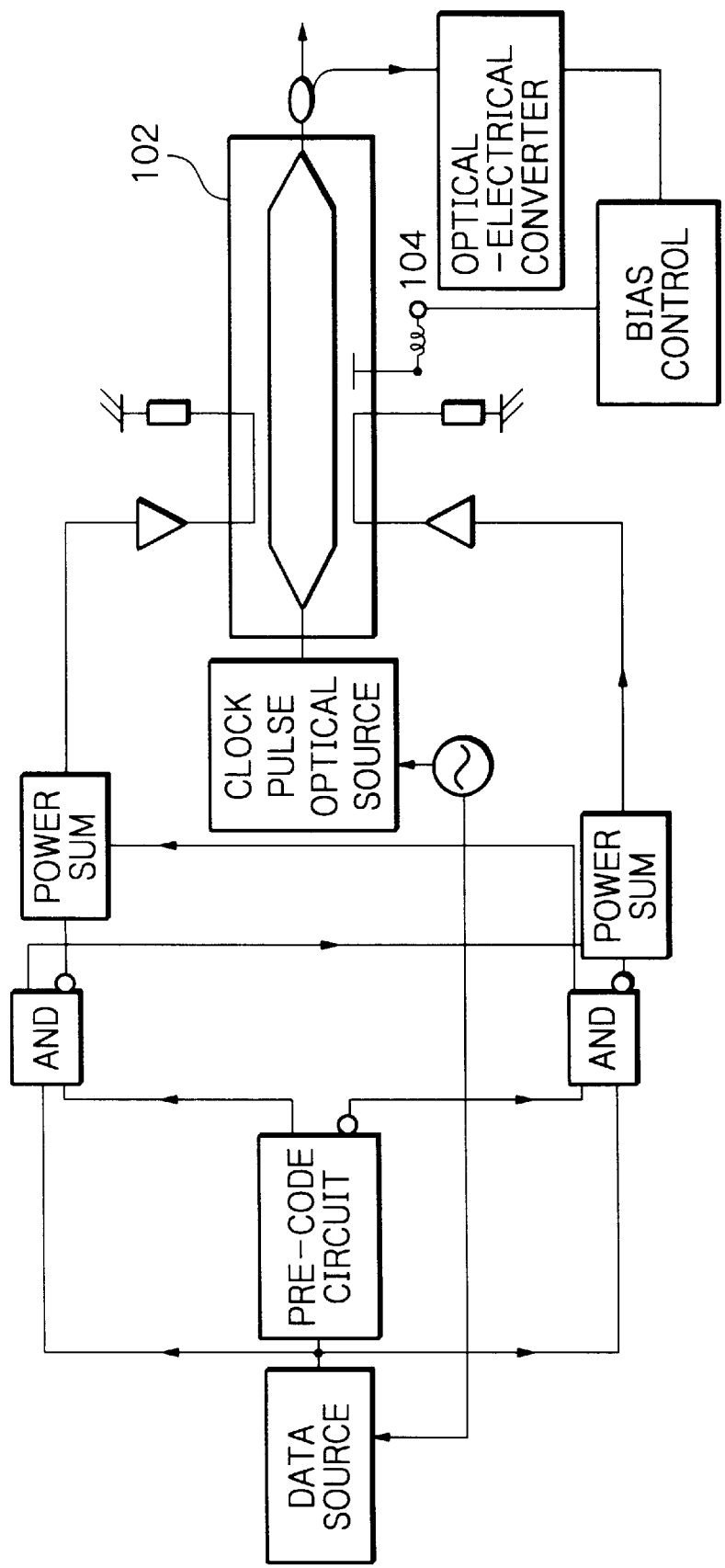
FIG. 25 shows bias control for the device of FIG. 20.

The fourth embodiment is described in accordance with FIGS. 20–25. FIG. 20 is a block diagram of an optical transmission system according to the present invention, FIG. 21 is a power sum means used in the device of FIG. 20, FIG. 22 is a pre-code circuit used in the device of FIG. 20, FIG. 23 shows operational waveforms in the device of FIG. 20, FIG. 24 shows bias condition of ternary power sum electrical signal applied to the optical intensity modulator according to the present invention, and FIG. 25 shows how bias voltage is applied to the optical intensity modulator.

The present embodiment has the feature that pattern jitter in modulated optical signal is decreased, since an optical pulse train which has less pattern jitter is modulated. An input NRZ electrical signal is applied to a pre-code circuit 72, which provides complementary pre-code NRZ signals B1 and B2. Each of the signals B1 and B2 are inverted each time a mark appears in the input NRZ electrical signal. And circuits 82 and 82' provide logical product (AND) between an input NRZ electrical signal and pre-coded NRZ outputs B1 and B2 so that the output ports C2 and C3 provide a mark alternately for each mark in an input NRZ electrical signal. An optical intensity modulator 102 in FIG. 20 is a MZ (Mach Zehnder) type optical intensity modulator in push-pull configuration. The logical product signals C1, C2, C3 and C4 are converted into ternary complementary power sum signals D1' and D2' by power sum circuits 100 and 101. The ternary signals D1' and D2' are biased as shown in FIG. 24, and then, applied to the modulator in push-pull configuration. The MZ type optical intensity modulator 102 modulates RZ optical clock pulse from the clock pulse optical source so that optical phases corresponding to first and third levels of the complementary power sum outputs differ by pi (¶) from each other by setting the second level of the complementary power sum output signal to the bias point at which transmittance of the optical modulator is null.

FIG. 21 shows power sum circuits 100 and 101 which are implemented by using a passive element. In case of a 50 ohm system, a 6 dB power sum is obtained by designing a resistor R to be 50 ohms.

FIG. 25 shows how a bias voltage is applied to an optical intensity modulator 102. The modulator 102 has a bias port 104 which is electrically isolated from a modulation section. The bias voltage is applied to one of the optical waveguides through the bias port.

Fifth Embodiment

Figure 27:
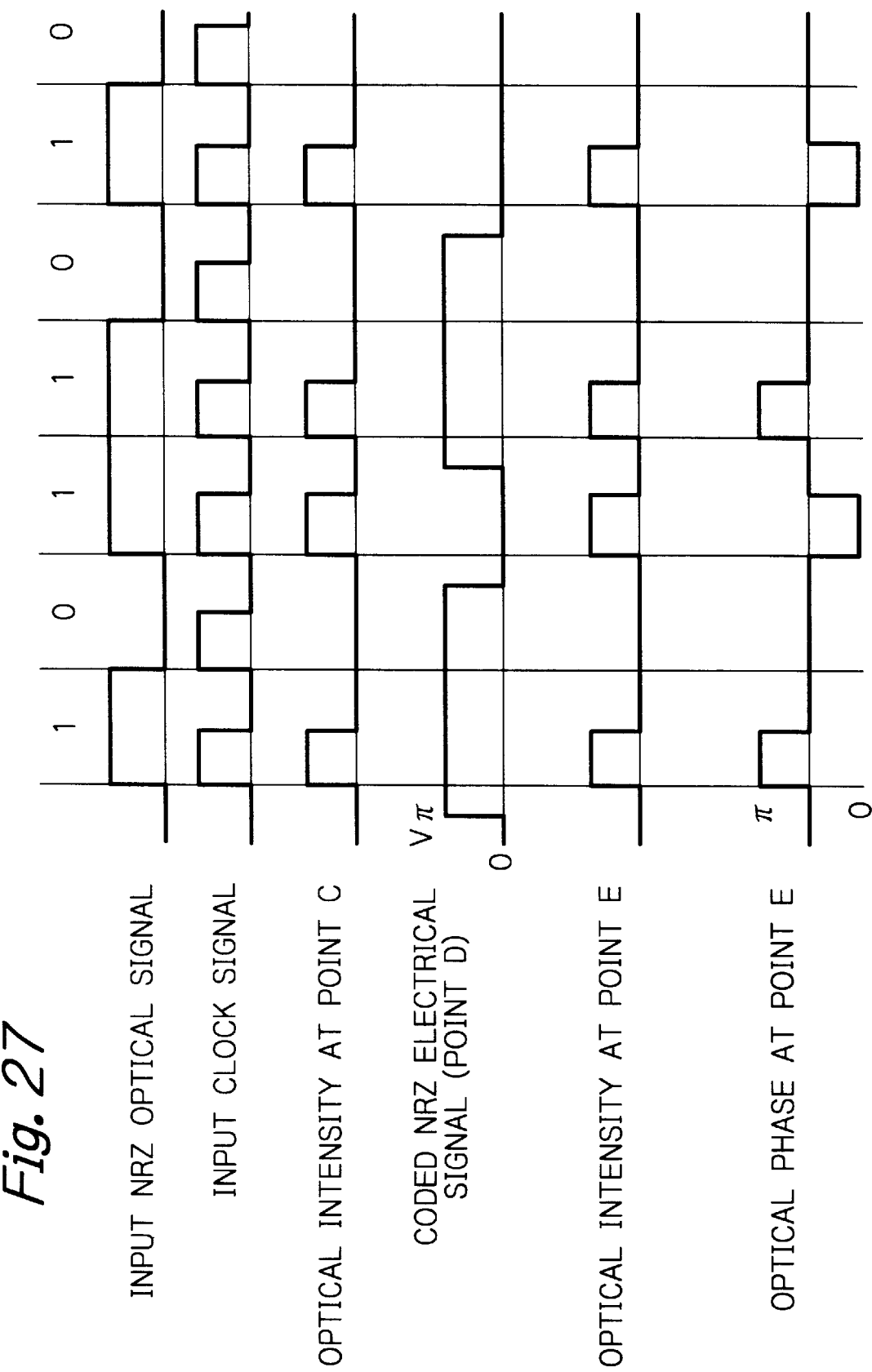
FIG. 27 shows operational waveforms in the device of FIG. 26.
Figure 28:
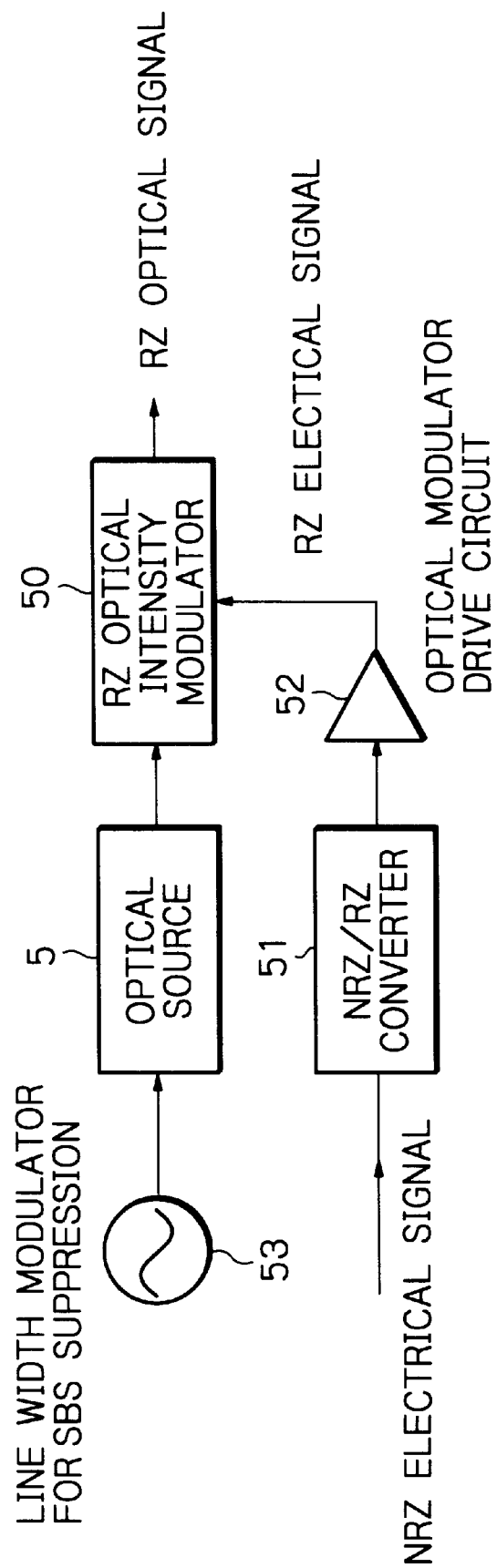
FIG. 28 is a block diagram of a prior optical transmission system.

FIG. 26 and FIG. 27 show still another embodiment of the present optical transmission system. FIG. 26 is a block diagram of the embodiment according to the present invention. FIG. 27 shows operational waveforms at each points in FIG. 26.

In FIG. 26, the optical intensity modulation is implemented by the optical intensity modulators 31 and 32, and the optical phase modulation is implemented by the optical phase modulator 40.

The continuous optical signal generated by the optical source 5 is modulated with a clock pulse which is synchronized with transmission rate in the first optical modulator 31 so that the clock pulse train of an optical signal is provided. The clock pulse train optical signal is modulated by data signal which is NRZ electrical signal in the second optical intensity modulator 32 so that conventional RZ optical signal is provided. An input NRZ electrical signal (DATA) is also applied to a pre-code circuit 1, which provides pre-coded NRZ signal as shown at D. The phase modulator 40 provides optical phase at point E changing to zero and pi alternately by each optical pulse according to the pre-coded electrical pulse at point D.

Effect of the Invention

As described above in detail, according to the present invention, the bandwidth of electrical signal for operating a driver and an optical intensity modulator is half of that of a prior art, and therefore, a high speed optical transmission system is obtained.

Further, as the bandwidth of an optical signal is half of that of the prior art, the degradation of transmission quality due to chromatic dispersion in an optical transmission line is decreased.

Further, an optical carrier component is suppressed in the present invention. Therefore, no line spectrum component is included in an optical signal spectrum. It is advantageous to increase the allowable launched power to an optical fiber restricted by Stimulated Brillouin Scattering (SBS), and to decrease the waveform distortion by four wave mixing.

Further, optical phase changes alternately by each optical pulse. Therefore, no inter-symbol interference occurs under multi-path fading condition due to polarization dispersion in a transmission line, since phase at overlapped portion of a pulse edge is opposite to each other and the intensity at a pulse edge of an intensity modulated optical signal is cancelled by the interference.

In summarizing, the bandwidth of an optical signal is half of that of the prior art. The bandwidth required for an electrical circuit is approximately equal to transmission rate B. The restriction to input power to an optical fiber line due to Stimulated Brillouin Scattering is removed, and optical power required for an optical source is decreased. No D.C. level fluctuation due to mark ratio occurs. No cross talk occurs due to four wave mixing. And, further, no inter-symbol interference occurs.

From the foregoing, it will now be apparent that a new and improved optical transmission system has been found. It should be understood of course that the embodiments disclosed are merely illustrative and not intended to limit the scope of the invention. Therefore, reference should be made to the appended claims to indicate the scope of the invention.

What is claimed is:

1. An optical transmission system having an input terminal which receives NRZ (non-return-to-zero) electrical signal, and electrical-optical conversion means which receives said NRZ electrical signal and converts the same to RZ (return-to-zero) optical signal, wherein
    said electrical-optical conversion means comprises;
        pre-code means receiving an NRZ electrical signal in complementary form and providing a pre-coded signal which is an exclusive-OR signal of said NRZ electrical signal and delayed signal of said exclusive-OR signal by one bit,
        differentiation means for providing differentiated ternary pulses having first level, second level and third level at a rising edge, a duration between a rising edge and a falling edge, and falling edge, respectively, of said pre-coded signal so that polarity of a pulse at said rising edge is opposite to that at said falling edge, and an optical intensity modulation means for providing an optical signal according to said differentiated pulses so that an optical phase corresponding to the first level of the differentiated pulse is opposite to an optical phase corresponding to the third level of the differentiated pulse.

2. An optical transmission system having an input terminal which receives NRZ (non-return-to-zero) electrical signal, and electrical-optical conversion means which receives said NRZ electrical signal and converts the same to RZ (return-to-zero) optical signal, wherein said electrical-optical conversion means comprises;

pre-code means receiving an NRZ electrical signal in signal-end form and providing a pre-coded signal which is an exclusive-OR signal of said NRZ electrical signal and delayed signal of said exclusive-OR signal by one bit, differentiation means for providing differentiated ternary pulses having first level, second level and third level at a rising edge, a duration between a rising edge and a falling edge and falling edge, respectively, of said pre-coded signal so that polarity of a pulse at said rising edge is opposite to that at said falling edge, and an optical intensity modulation means for providing an optical signal according to the first level and the third level of said differentiated pulses so that an optical phase corresponding to the first level of the differentiated pulse is opposite to an optical phase corresponding to the third level of the differentiated pulse.

3. An optical transmission system according to claim 1 or 2, wherein said optical intensity modulation means has a bias port for accepting operational bias voltage, and said bias port is electrically isolated from said differentiated ternary pulses.

4. An optical transmission system having an input terminal which receives NRZ (non-return-to-zero) electrical signal, and electrical-optical conversion means which receives said NRZ electrical signal and converts the same to RZ (return-to-zero) optical signal, wherein said electrical-optical conversion means comprises;

clock electrical signal generation means for providing clock electrical signal with which said NRZ electrical signal is synchronized, clock pulse optical source receiving said clock electrical signal and providing optical clock pulse synchronized with said clock electrical signal, pre-code means receiving an NRZ electrical signal in single-end form and providing a pre-coded signal in complementary form which is an exclusive-OR signal of said NRZ electrical signal and delayed signal of said exclusive-OR signal by one bit, a pair of complementary logical product means for providing complementary logical product signals each of which is a logical product of said NRZ electrical signal and one of pre-coded complementary NRZ signals, an optical intensity modulation means having two modulation sections electrically isolated with each other and arranged in series along optical path for modulating intensity and phase of said optical clock pulse independently with said complementary logical product signals so that optical phase in mark bits alternates between 0 and π.

5. An optical transmission system according to claim 4, wherein said optical intensity modulation means has a bias port for accepting operational bias voltage, and said bias port is electrically isolated from said complementary logical product signals.

6. An optical transmission system having an input terminal which receives NRZ (non-return-to-zero) electrical signal, and electrical-optical conversion means which receives said NRZ electrical signal and converts the same to RZ (return-to-zero) optical signal, wherein said electrical-optical conversion means comprises;

clock electrical signal generation means for providing clock electrical signal with which said NRZ electrical signal is synchronized, clock pulse optical source receiving said clock electrical signal and providing optical clock pulse synchronized with said clock electrical signal, pre-code means receiving an NRZ electrical signal in signal-end form and providing a pre-coded signal in complementary form which is an exclusive-OR signal of said NRZ electrical signal and delayed signal of said exclusive-OR signal by one bit, a pair of complementary logical product means for providing logical product signals in complementary form, each of said logical product signals being a logical product of said NRZ electrical signal and one of pre-coded differential NRZ signals, a pair of power sum means for providing power sum of one output of one of said complementary logical product means and a complementary output of the other complementary logical product means, and an optical intensity modulation means for modulating said optical clock pulse with outputs of said power sum means so that phase of an optical output signal corresponding to first level of said power sum is inverted from phase of an optical output signal corresponding to third level of said power sum.

7. An optical transmission system according to one of claim 1, 2, 4 or 6, wherein said optical intensity modulation means comprises a Mach-Zehnder optical intensity modulator.

8. An optical transmission system having an input terminal which receives NRZ (non-return-to-zero) electrical signal, and electrical-optical conversion means which receives said NRZ electrical signal and converts the same to RZ (return-to-zero) optical signal, wherein said electrical-optical conversion means comprises;

a first optical intensity modulation means for modulating continuous optical signal with electrical clock signal, a second optical intensity modulation means for modulating an output of said first optical intensity modulation means with said NRZ electrical signal, pre-code means receiving an NRZ electrical signal and providing a pre-coded signal which is an exclusive-OR signal of said NRZ electrical signal and delayed signal of said exclusive-OR signal by one bit, and an optical phase modulation means for modulating phase of an output of said second optical intensity modulation means with an output of said pre-code means so that the optical phase of the mark bits in the optical RZ signal obtained from said second optical intensity modulation means alternates between 0 and pi.

* * * * *